(12) United States Patent
Pedersen et al.

(10) Patent No.: US 10,694,360 B2
(45) Date of Patent: *Jun. 23, 2020

(54) HEARING DEVICE AND METHOD OF HEARING DEVICE COMMUNICATION

(71) Applicant: GN HEARING A/S, Ballerup (DK)

(72) Inventors: Brian Dam Pedersen, Ringsted (DK); Allan Munk Vendelbo, Valby (DK)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/045,483

(22) Filed: Jul. 25, 2018

(65) Prior Publication Data

US 2019/0037380 A1 Jan. 31, 2019

Related U.S. Application Data

(63) Continuation of application No. 14/793,587, filed on Jul. 7, 2015, now Pat. No. 10,104,522.

(30) Foreign Application Priority Data

Jul. 2, 2015 (DK) .................................. 2015 70434
Jul. 2, 2015 (EP) ..................................... 15175138

(51) Int. Cl.
*H04L 29/06* (2006.01)
*H04W 4/80* (2018.01)
(Continued)

(52) U.S. Cl.
CPC .............. *H04W 4/80* (2018.02); *H04R 25/70* (2013.01); *H04W 12/003* (2019.01);
(Continued)

(58) Field of Classification Search
CPC . H04L 63/0876; H04L 63/123; H04R 25/554; H04R 25/505; H04R 2225/55;
(Continued)

(56) References Cited

U.S. PATENT DOCUMENTS 5,757,920 A * 5/1998 Misra ...................... G06F 21/33
705/76
5,809,140 A * 9/1998 Rubin ................... H04L 9/0827
380/279

(Continued)

OTHER PUBLICATIONS

Final Office Action dated Feb. 21, 2020 for related U.S. Appl. No. 16/130,459.

(Continued)

*Primary Examiner* — John B King
(74) *Attorney, Agent, or Firm* — Vista IP Law Group, LLP

(57) ABSTRACT

A hearing device includes: a processing unit configured to compensate for hearing loss of a user of the hearing device; a memory unit; and an interface; wherein the processing unit is configured to: receive a connection request for a session via the interface; obtain a session identifier; transmit, via the interface, a connection response comprising a hearing device identifier and the session identifier; receive, via the interface, an authentication message comprising an authentication key identifier and client device data; select a hearing device key from a plurality of hearing device keys in the memory unit based on the authentication key identifier; and verify the client device data based on the selected hearing device key.

28 Claims, 6 Drawing Sheets

(51) Int. Cl.
   *H04R 25/00* (2006.01)
   *H04W 12/02* (2009.01)
   *H04W 12/00* (2009.01)

(52) U.S. Cl.
   CPC ........... *H04W 12/02* (2013.01); *H04R 25/554* (2013.01); *H04R 2225/55* (2013.01); *H04R 2460/03* (2013.01)

(58) Field of Classification Search
   CPC ..... H04R 25/70; H04R 2460/03; H04W 4/80; H04W 12/003; H04W 12/02
   See application file for complete search history.

(56) References Cited

U.S. PATENT DOCUMENTS

| | | | | | |
|---|---|---|---|---|---|
| 6,055,575 | A * | 4/2000 | Paulsen | H04L 29/06 | 709/226 |
| 6,556,686 | B1 * | 4/2003 | Weidner | H04R 25/556 | 381/312 |
| 6,636,966 | B1 * | 10/2003 | Lee | G06F 21/10 | 713/165 |
| 6,658,307 | B1 * | 12/2003 | Mueller | H04R 25/70 | 381/23.1 |
| 6,724,862 | B1 * | 4/2004 | Shaffer | H04M 1/6016 | 379/347 |
| 8,670,355 | B1 * | 3/2014 | Frerking | H04R 25/554 | 370/252 |
| 8,812,851 | B2 * | 8/2014 | Schwarz | G06F 21/33 | 713/155 |
| 9,119,009 | B1 | 8/2015 | Folkmanis | | |
| 9,166,782 | B2 * | 10/2015 | Boren | H04L 9/0822 | |
| 9,219,966 | B2 * | 12/2015 | Wang | H04W 8/005 | |
| 9,317,688 | B2 * | 4/2016 | Yegin | G06F 21/57 | |
| 9,319,220 | B2 * | 4/2016 | Grewal | H04L 9/083 | |
| 9,402,179 | B1 * | 7/2016 | Miller | H04W 12/06 | |
| 9,608,807 | B2 * | 3/2017 | Pedersen | H04L 9/0819 | |
| 9,613,028 | B2 * | 4/2017 | Foo | H04R 25/50 | |
| 2002/0054689 | A1 * | 5/2002 | Zhang | H04R 25/70 | 381/312 |
| 2002/0169717 | A1 * | 11/2002 | Challener | G06Q 20/10 | 705/40 |
| 2002/0196159 | A1 * | 12/2002 | Lesenne | H04N 21/43 | 340/13.24 |
| 2003/0084290 | A1 * | 5/2003 | Murty | H04L 63/0428 | 713/168 |
| 2004/0000071 | A1 * | 1/2004 | Auger | A43B 5/02 | 36/59 R |
| 2004/0117650 | A1 * | 6/2004 | Karaoguz | H04L 63/083 | 726/26 |
| 2004/0117818 | A1 * | 6/2004 | Karaoguz | H04N 21/4627 | 725/31 |
| 2004/0125958 | A1 * | 7/2004 | Brewster | H04K 1/00 | 380/270 |
| 2004/0162980 | A1 * | 8/2004 | Lesenne | H04L 63/0442 | 713/153 |
| 2005/0154889 | A1 * | 7/2005 | Ashley | H04L 63/0435 | 713/171 |
| 2006/0005237 | A1 * | 1/2006 | Kobata | H04L 63/0823 | 726/12 |
| 2006/0090074 | A1 * | 4/2006 | Matoba | H04L 63/0272 | 713/171 |
| 2006/0129848 | A1 * | 6/2006 | Paksoy | G06F 21/78 | 713/193 |
| 2006/0225090 | A1 * | 10/2006 | Shim | H04W 8/02 | 725/25 |
| 2007/0078866 | A1 * | 4/2007 | Takashima | G06F 21/10 | |
| 2007/0243885 | A1 * | 10/2007 | Shim | H04L 67/18 | 455/456.2 |
| 2008/0005568 | A1 * | 1/2008 | Watson | G06Q 20/3674 | 713/176 |
| 2008/0014962 | A1 * | 1/2008 | Shim | H04W 4/029 | 455/456.1 |
| 2008/0020707 | A1 * | 1/2008 | Takayama | H04L 63/045 | 455/41.2 |
| 2008/0049957 | A1 * | 2/2008 | Topholm | H04R 25/558 | 381/315 |
| 2008/0075067 | A1 * | 3/2008 | Guglielmi | H04W 76/15 | 370/352 |
| 2008/0254809 | A1 * | 10/2008 | Kraufvelin | H04W 8/205 | 455/456.1 |
| 2009/0210699 | A1 * | 8/2009 | Grewal | H04L 9/083 | 713/155 |
| 2010/0017596 | A1 * | 1/2010 | Schertzinger | G06F 21/33 | 713/155 |
| 2010/0067711 | A1 * | 3/2010 | Waldmann | H04R 25/658 | 381/60 |
| 2010/0104122 | A1 * | 4/2010 | Waldmann | H04R 25/70 | 381/314 |
| 2010/0205447 | A1 * | 8/2010 | Waldmann | H04R 25/70 | 713/182 |
| 2010/0290627 | A1 * | 11/2010 | Tsuji | H04L 9/0825 | 380/282 |
| 2010/0306525 | A1 * | 12/2010 | Ferguson | H04L 63/0442 | 713/151 |
| 2011/0188684 | A1 * | 8/2011 | Spieler | G06F 8/65 | 381/315 |
| 2011/0238987 | A1 * | 9/2011 | Kherani | H04L 1/0041 | 713/168 |
| 2011/0291803 | A1 * | 12/2011 | Bajic | G08B 13/2462 | 340/10.1 |
| 2011/0293123 | A1 * | 12/2011 | Neumeyer | H04R 25/50 | 381/314 |
| 2011/0293124 | A1 * | 12/2011 | Ma | H04R 25/453 | 381/318 |
| 2012/0036364 | A1 * | 2/2012 | Yoneda | H04L 9/30 | 713/175 |
| 2012/0140962 | A1 * | 6/2012 | Ubezio | H04R 25/558 | 381/314 |
| 2012/0252411 | A1 * | 10/2012 | Johnsgard | G07C 9/00158 | 455/411 |
| 2012/0252531 | A1 * | 10/2012 | King | H04L 63/062 | 455/558 |
| 2012/0266223 | A1 * | 10/2012 | Yegin | G06F 21/57 | 726/7 |
| 2013/0024798 | A1 * | 1/2013 | Schneider | H04R 25/70 | 715/771 |
| 2013/0077791 | A1 * | 3/2013 | Kozuka | H04L 9/3268 | 380/277 |
| 2013/0177188 | A1 * | 7/2013 | Apfel | H04R 25/558 | 381/315 |
| 2013/0177189 | A1 * | 7/2013 | Bryant | H04R 25/55 | 381/315 |
| 2013/0202138 | A1 * | 8/2013 | Nishizaki | H04R 25/70 | 381/315 |
| 2013/0251179 | A1 * | 9/2013 | Aschoff | G06F 8/31 | 381/314 |
| 2013/0257364 | A1 * | 10/2013 | Redding | H02J 5/005 | 320/108 |
| 2013/0290733 | A1 * | 10/2013 | Branton | H04L 9/0863 | 713/189 |
| 2013/0290734 | A1 * | 10/2013 | Branton | H04L 9/0863 | 713/189 |
| 2013/0329924 | A1 * | 12/2013 | Fleizach | H04R 25/558 | 381/314 |
| 2014/0004825 | A1 * | 1/2014 | Prakash | H04W 12/06 | 455/411 |
| 2014/0050341 | A1 * | 2/2014 | Flynn | H04R 25/606 | 381/326 |
| 2014/0181522 | A1 * | 6/2014 | Tanizawa | H04L 63/06 | 713/171 |
| 2014/0193008 | A1 * | 7/2014 | Zukic | H04R 25/70 | 381/314 |
| 2014/0211973 | A1 * | 7/2014 | Wang | H04W 8/005 | 381/315 |
| 2014/0289516 | A1 * | 9/2014 | Sahay | H04L 9/3263 | 713/162 |
| 2014/0331064 | A1 * | 11/2014 | Ballesteros | G06F 12/1408 | 713/193 |

(56) References Cited

U.S. PATENT DOCUMENTS

| | | | | |
|---|---|---|---|---|
| 2014/0334629 A1* | 11/2014 | Andersen | H04R 25/70 | 381/60 |
| 2014/0341405 A1* | 11/2014 | Pedersen | H04R 25/554 | 381/315 |
| 2015/0023534 A1* | 1/2015 | Shennib | H04R 25/70 | 381/314 |
| 2015/0281863 A1 | 10/2015 | Westergaard | | |
| 2015/0289062 A1* | 10/2015 | Ungstrup | H04R 25/554 | 381/314 |
| 2016/0142838 A1* | 5/2016 | Thomsen | H04R 25/505 | 381/314 |
| 2016/0173278 A1* | 6/2016 | Pedersen | H04L 9/0819 | 380/255 |
| 2016/0173462 A1* | 6/2016 | Pedersen | H04L 63/062 | 713/171 |
| 2016/0173997 A1* | 6/2016 | Pedersen | H04R 25/00 | 381/314 |
| 2016/0255448 A1* | 9/2016 | Morant | H04R 25/30 | 381/314 |
| 2016/0337769 A1* | 11/2016 | Siddhartha | H04R 25/70 | |
| 2017/0099550 A1* | 4/2017 | Blessing | H04R 25/50 | |
| 2017/0180419 A1* | 6/2017 | Pedersen | H04L 9/14 | |
| 2017/0180886 A1* | 6/2017 | Van Der Loo | H04R 25/554 | |
| 2017/0286918 A1* | 10/2017 | Westermann | G06Q 10/20 | |
| 2017/0318400 A1* | 11/2017 | Westermann | H04R 25/554 | |
| 2017/0318457 A1* | 11/2017 | Westermann | G06F 19/3418 | |

OTHER PUBLICATIONS

Notice of Allowance and Fee(s) dated Feb. 7, 2020 for related U.S. Appl. No. 16/264,680.
First Office Action dated Mar. 23, 2020 for Corresponding Chinese Application No. 201610515807.8.

\* cited by examiner

HEARING DEVICE AND METHOD OF HEARING DEVICE COMMUNICATION

RELATED APPLICATION DATA

This application is a continuation of U.S. patent application Ser. No. 14/793,587 filed on Jul. 7, 2015, pending, which claims priority to and the benefit of Danish Patent Application No. PA 2015 70434 filed on Jul. 2, 2015, pending, and European Patent Application No. 15175138.5 filed on Jul. 2, 2015, pending. The entire disclosures of the above applications are expressly incorporated by reference herein.

FIELD

The present disclosure pertains to the field of hearing devices, and in particular to hearing device security. Hearing device and method for secure hearing device communication is disclosed.

BACKGROUND

Functionalities of a hearing device become increasingly advanced. Wireless communications between a hearing device and external devices, such as hearing device fitting apparatus, tablets, smart phones and remote controllers, have evolved. A wireless communication interface of a hearing device uses an open standard-based interface. However, this poses many challenges in terms of security. A hearing device may assume any incoming data as legitimate, and may allow memory to be written or changed by an unauthorized party. Any such attacks may result in a malfunction of the hearing aid, or a battery exhaustion attack.

However a hearing device is a very small device with strict constraints in terms of computational power, memory space etc. Off-the-shelf security algorithms and protocols cannot be readily functional on a hearing device.

SUMMARY

There is a need for methods and hearing devices providing improved security.

Disclosed is a hearing device. The hearing device comprises a processing unit, a memory unit and an interface. The hearing device may comprise a processing unit configured to compensate for hearing loss of a user of the hearing device. The processing unit is configured to receive a connection request for a session via the interface; and to obtain a session identifier. The processing unit may be configured to transmit via the interface a connection response comprising a hearing device identifier and the session identifier. The processing unit is configured to receive, via the interface, an authentication message. The authentication message may comprise an authentication key identifier and/or client device data. The processing unit may be configured to select a hearing device key from a plurality of hearing device keys in the memory unit, e.g. based on the authentication key identifier. The processing unit may be configured to verify the client device data, e.g. based on the selected hearing device key or a default hearing device key; and to terminate the session if verification fails.

Also disclosed is a method of operating a hearing device. The hearing device comprises a processing unit configured to compensate for hearing loss of a user of the hearing device, a memory unit, and an interface. The method comprises receiving a connection request for a session via the interface. The method comprises obtaining a session identifier. The method may comprise transmitting via the interface a connection response comprising a hearing device identifier and/or the session identifier. The method comprises receiving, via the interface, an authentication message. The authentication message comprises an authentication key identifier and/or client device data. The method may comprise selecting a hearing device key from a plurality of hearing device keys in the memory unit, e.g. based on the authentication key identifier. The method may comprise verifying the client device data, e.g. based on the selected hearing device key or a default hearing device key, and terminating the session if verification fails.

The disclosed hearing device and method provides that the hearing device is capable of securing access thereto from unauthenticated parties, and securing its communication against eavesdropping, modification attacks and replay attacks while minimizing computational overhead and power consumption of the hearing device. This disclosure provides a hearing device the ability to perform various levels of authentication of a communicating party and received message as well as to derive keying material for securing communication against eavesdropping with no secrets exchanged in plain text. This disclosure provides a hearing device that supports authentication and/or confidentiality of its communications. Furthermore, the present disclosure provides a scalable security architecture.

A hearing device includes: a processing unit configured to compensate for hearing loss of a user of the hearing device; a memory unit; and an interface; wherein the processing unit is configured to: receive a connection request for a session via the interface; obtain a session identifier; transmit, via the interface, a connection response comprising a hearing device identifier and the session identifier; receive, via the interface, an authentication message comprising an authentication key identifier and client device data; select a hearing device key from a plurality of hearing device keys in the memory unit based on the authentication key identifier; and verify the client device data based on the selected hearing device key.

Optionally, the session identifier is for a session, and wherein the processing unit is configured to terminate the session if a verification of the client device data fails.

Optionally, the authentication message comprises an authentication type identifier, and wherein the processing unit is configured to select the hearing device key from the plurality of hearing device keys based on the authentication type identifier.

Optionally, the client device data comprises an encrypted client device certificate; wherein the processing unit is configured to generate a certificate key based on a common secret; and wherein the processing unit is configured to verify the client device data by decrypting the encrypted client device certificate with the certificate key to obtain a decrypted version of the encrypted client device certificate.

Optionally, the common secret is based on the selected hearing device key and/or the session identifier.

Optionally, the processing unit is configured to verify the client device data by determining whether the authentication key identifier matches a client device key identifier of the client device certificate.

Optionally, the processing unit is configured to verify the client device data by determining whether a client device type identifier of the client device certificate is valid.

Optionally, the processing unit is configured to verify the client device data by verifying a digital signature of the client device certificate.

Optionally, the client device certificate comprises a signing device identifier and/or a client device identifier, and wherein the processing unit is configured to verify the client device data by determining whether the signing device identifier and/or the client device identifier is valid.

Optionally, the processing unit is configured to generate a session key based on the session identifier and the hearing device key, and wherein the processing unit is configured to receive and authenticate session data based on the session key.

A method of operating a hearing device comprising a processing unit configured to compensate for hearing loss of a user of the hearing device, a memory unit, and an interface, the method includes: receiving a connection request for a session via the interface; obtaining a session identifier; transmitting, via the interface, a connection response comprising a hearing device identifier and the session identifier; receiving, via the interface, an authentication message comprising an authentication key identifier and client device data; selecting a hearing device key from a plurality of hearing device keys based on the authentication key identifier; and verifying the client device data based on the selected hearing device key.

Other features, advantageous, and/or embodiments will be described below in the detailed description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
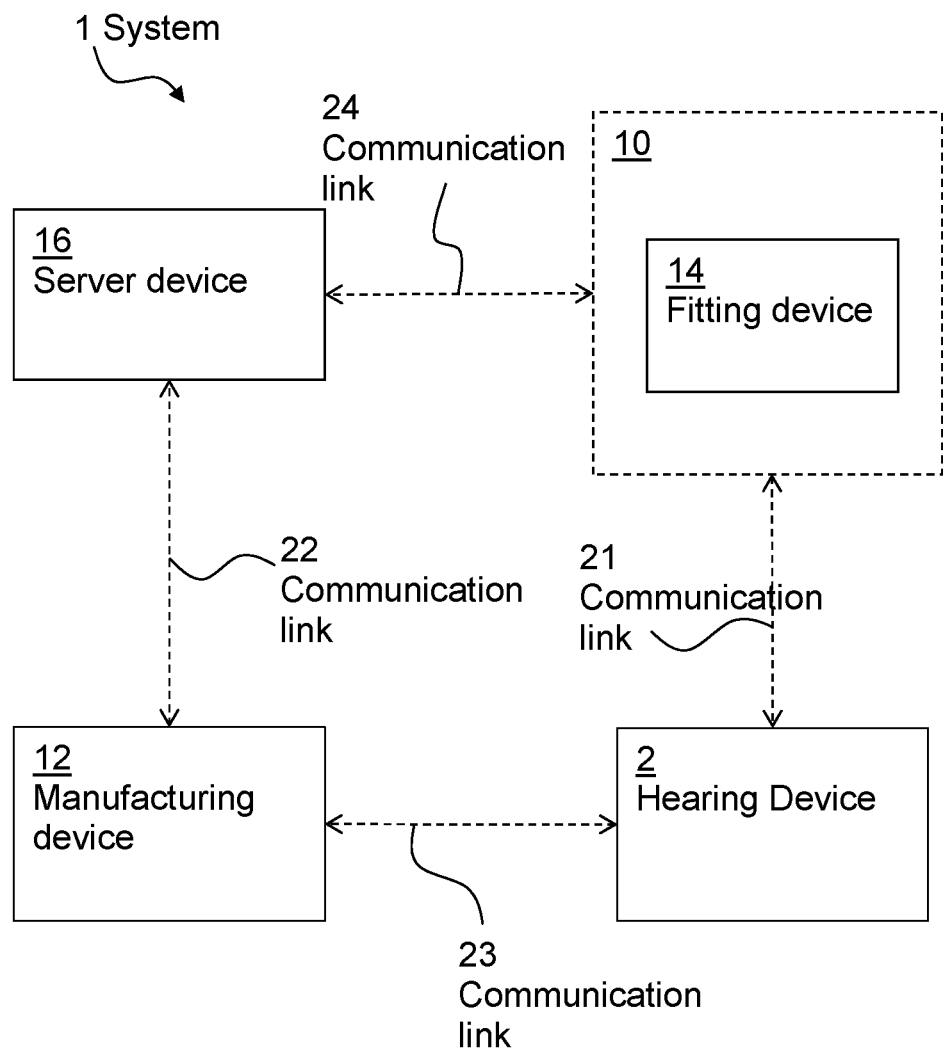
FIG. 1 schematically illustrates an exemplary architecture according to this disclosure, FIG. 2 schematically illustrates an exemplary hearing device, FIG. 3A schematically illustrates an exemplary client device certificate, FIG. 3B schematically illustrates an exemplary hearing device certificate, FIG. 4 schematically illustrates an exemplary signalling diagram, and FIG. 5 schematically illustrates a flowchart of an exemplary method.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

It is an object of the present disclosure to provide a hearing device, and a method of operating a hearing device which seeks to mitigate, alleviate, or eliminate one or more of the above-identified deficiencies in the art and disadvantages singly or in any combination.

The present disclosure relates to improved security of a hearing device. Namely, the hearing device disclosed herein is robust against security threats, vulnerabilities and attacks by implementing appropriate safeguards and countermeasures, such as security mechanisms, to protect against threats and attacks. The present disclosure relates to a hearing device that is robust against replay attacks, unauthorized access, battery exhaustion attacks, eavesdropping and man-in-the-middle attacks.

As used herein, the term "hearing device" refers to a device configured to assist a user in hearing a sound, such as a hearing instrument, a hearing aid device, a headset, a pair of headphones, etc.

As used herein, the term "certificate" refers to a data structure that enables verification of its origin and content, such as verifying the legitimacy and/or authenticity of its origin and content. The certificate is configured to provide a content that is associated to a holder of the certificate by an issuer of the certificate. The certificate comprises a digital signature, so that a recipient of the certificate is able to verify or authenticate the certificate content and origin. The certificate may comprise one or more identifiers and/or keying material, such as one or more cryptographic keys (e.g. a hearing device key) enabling secure communication in a hearing device system. The certificate permits thus to achieve authentication of origin and content, non-repudiation, and/or integrity protection. The certificate may further comprise a validity period, one or more algorithm parameters, and/or an issuer. A certificate may comprise a digital certificate, a public key certificate, an attribute certificate, and/or an authorization certificate.

As used herein, the term "key" refers to a cryptographic key, i.e. a piece of data, (e.g. a string, a parameter) that determines a functional output of a cryptographic algorithm. For example, during encryption, the key allows a transformation of a plaintext into a cipher-text and vice versa during decryption. The key may also be used to verify a digital signature and/or a message authentication code, MAC. A key is so called a symmetric key when the same key is used for both encryption and decryption. In asymmetric cryptography or public key cryptography, a keying material is a key pair, so called a private-public key pair comprising a public key and a private key. In an asymmetric or public key cryptosystem (such as Rivest Shamir Adelman, RSA, cryptosystem, and elliptic curve cryptography, ECC), the public key is used for encryption and/or signature verification while the private key is used for decryption and/or signature generation. The hearing device key may be keying material allowing deriving one or more symmetric keys, such as a session key and/or a certificate key for hearing device communication. The hearing device key may be stored in a memory unit of the hearing device, e.g. during manufacture. The hearing device key may comprise keying material that is used to derive a symmetric key. The hearing device key comprises for example an Advanced Encryption Standard, AES, key, such as an AES-128 bits key.

As used herein the term "identifier" refers to a piece of data that is used for identifying, such as for categorizing, and/or uniquely identifying. The identifier may be in a form of a word, a number, a letter, a symbol, a list, an array or any combination thereof. For example, the identifier as a number may be in the form of an integer, such as unsigned integer, uint, with a length of e.g. 8 bits, 16 bits, 32 bits, etc., such as an array of unsigned integers.

The term "client device" as used herein refers to a device that is able to communicate with the hearing device. The client device may refer to a computing device acting as a client. The client device may comprise a fitting device, a handheld device, a relay, a tablet, a personal computer, a mobile phone, an application running on a personal computer or tablet, or mobile phone and/or USB dongle plugged into a personal computer. The client device may be attributed a client device type corresponding to a model, category or type of client devices, such as a fitting type, e.g. a tablet product model, category or type for fitting the hearing device, a USB dongle product model, category or type for fitting the hearing device. The client device may control operation of the hearing device, either by sending fitting data, hearing device operating parameters, and/or firmware data.

The present disclosure relates to a hearing device. The hearing device comprises a processing unit, a memory unit and an interface. The memory unit may include removable and non-removable data storage units including, but not limited to, Read Only Memory (ROM), Random Access Memory (RAM), etc. The memory unit may have a hearing device certificate stored thereon. The memory unit may have the hearing device certificate stored at a memory address of the memory unit, and/or in memory cells of the memory unit, such as in designated memory cells and/or at designated addresses. The hearing device may comprise a processing unit configured to compensate for hearing loss of a user of the hearing device. The interface may comprise a wireless transceiver, e.g. configured for wireless communication at frequencies in the range from 2.4 to 2.5 GHz. In one or more exemplary hearing devices, the interface is configured for communication, such as wireless communication, with a client device or a hearing device, respectively comprising a wireless transceiver configured to receive and/or transmit data. The processing unit may be configured to compensate for hearing loss of a user of the hearing device according to the received data. The processing unit is configured to receive a connection request for a session via the interface; and optionally to obtain a session identifier, e.g. in response to the connection request. The interface may be configured to receive the connection request for a session from a client device. The processing unit is configured to obtain a session identifier, such as by generating a random or pseudo-random number. The processing unit may be configured to store the session identifier in the memory unit. The memory unit may be configured to store the session identifier at a memory address of the memory unit, and/or in memory cells of the memory unit, such as in designated memory cells and/or at designated addresses. The connection request may comprise an authentication key identifier and/or an authentication type identifier, in order to permit the hearing device to perform authentication of the connection request and the client device sending the connection request at this early stage. This may provide a level of access control.

The processing unit is configured to transmit via the interface a connection response comprising a hearing device identifier and/or the session identifier. The processing unit may be configured to generate a connection response by including the session identifier and the hearing device identifier in the connection response. The hearing device identifier may refer to a unique identifier of the hearing device. The hearing device identifier may be included in the hearing device certificate. The interface may be configured to transmit the connection response to e.g. the client device.

The processing unit is configured to receive, via the interface, an authentication message comprising an authentication key identifier and/or client device data. For example, the interface may be configured to receive the authentication message from the client device. For example the hearing device receives the authentication message from the client device in order to establish a communication session. The client device data may comprise a client device certificate (encrypted or unencrypted), fitting data, hearing device operating parameters, and/or firmware data. For example, the authentication message may comprise an authentication key identifier in plain text. The authentication key identifier may be indicative of a hearing device key, e.g. a hearing device key stored in the memory unit of the hearing device, for example as part of the hearing device certificate.

The processing unit is optionally configured to select a hearing device key, e.g. from a plurality of hearing device keys in the memory unit, based on the authentication key identifier and/or other identifiers. When the authentication key identifier is acceptable by the hearing device based on a hearing device key identifier held by the hearing device, the processing unit may be configured to select a hearing device key that the authentication key identifier indicates and to use the selected hearing device key as keying material in securing the session. The processing unit may be configured to select a hearing device key, e.g. from a plurality of hearing device keys in the memory unit based on the authentication key identifier and/or an authentication type identifier. The authentication type identifier may be received in plaintext by the hearing device, and/or as client device type identifier in the client device certificate (encrypted or decrypted). For example, the processing unit may be configured to select a hearing device key which the authentication key identifier and the authentication type identifier indicate.

The processing unit is configured to verify the client device data, e.g. based on the selected hearing device key; and to terminate the session if verification fails. To verify the client device data may be based on a hearing device certificate or at least parts thereof. To verify the client device data based on the selected hearing device key may comprise verifying the integrity of the client device data based on the selected hearing device key, such as verifying a MAC and/or a digital signature comprised in the client device data. To verify the client device data based on the selected hearing device key may comprise decrypting the client device data, e.g. a client device certificate, using the selected hearing device key (as keying material to derive a decryption key or as a decryption key), when the client device data is received encrypted. To verify the client device data based on the selected hearing device key may comprise verifying the client device data, e.g. decrypted client device certificate, by comparing the received client device data with data stored in the memory unit. The client device data may comprise a client device certificate (such as an encrypted client device certificate), an authentication key identifier, and/or an authentication type identifier. The client device may be assigned a client device certificate. The client device certificate refers to a certificate generated and assigned to the client device by e.g. a device manufacturing the client device.

The client device certificate may comprise a certificate type identifier. The certificate type identifier may indicate a type of the certificate amongst a variety of certificate types, such as a hearing device family certificate type, a hearing device certificate type, a firmware certificate type, a research and development certificate type, client device certificate type. The certificate type identifier may be used by the hearing device to identify what type of certificate it receives, stores, and/or retrieves. The client device certificate may comprise a version identifier indicative of a data format version of the certificate. The hearing device may be configured to use the certificate type identifier and/or the version identifier to determine what type of data the certificate comprises, what type of data is comprised in a field of the certificate. For example, the hearing device determines based on the certificate type identifier and/or version identifier what field of the certificate comprises a digital signature and/or which public key is needed to verify the digital signature. It may be envisaged that there is a one-to-one mapping between the certificate type identifier and the public-private key pair.

The client device certificate may comprise a signing device identifier. The signing device identifier refers to a unique identifier identifying the device (such as a manufacturing device, e.g. an integrated circuit card, a smart card, a hardware security module) that has signed the client device certificate. The signing device identifier may for example comprise a medium access control, MAC, address of the signing device and/or a serial number. The signing device identifier optionally allows for example the hearing device to determine whether the signing device is e.g. black-listed or not, and thus to reject certificates signed by a signing device that is black-listed.

The client device certificate may comprise one or more hardware identifiers such as a first hardware identifier and/or a second hardware identifier. A hardware identifier may identify a piece of hardware comprised in the client device, such as a radio chip comprised in the client device or a digital signal processor of the client device. The hardware identifier may be stored in a register of the piece of hardware comprised in the hearing device during manufacturing of the piece of hardware. The hardware identifier may comprise a serial number, a medium access control, MAC, address, a chip identifier, or any combination thereof. The client device certificate may comprise a client device type identifier. A client device type identifier may be indicative of a type which the client device belongs to. The client device may be attributed a client device type corresponding to a model, category or type of client devices, such as a fitting type, e.g. a tablet product model, category or type configured for fitting the hearing device, a USB dongle product model, category or type configured for fitting the hearing device.

The client device certificate may comprise a client device identifier. The client device identifier refers to an identifier identifying a client device. The client device identifier may for example comprise a medium access control, MAC, address of the client device, and/or a serial number of the client device.

The client device certificate may comprise a client device key identifier. A client device key identifier may be indicative of the client device key used as keying material for securing a communication with an external party, such as with a hearing device. In one or more exemplary client device certificates, the client device certificate comprises a Bluetooth address of the client device.

The client device certificate comprises a digital signature. The digital signature enables a proof or verification of authenticity of the hearing device certificate, such as verification of the signer legitimacy. The digital signature is optionally generated by the manufacturing device using a client device fitting private key. The hearing device may be configured to verify the digital signature of the client device certificate when receiving the (encrypted or unencrypted) client device certificate comprising the digital signature (i.e. receiving the authentication message comprising the encrypted client device certificate, and obtaining a decrypted version of the client device certificate). The digital signature is verifiable by the hearing device using a corresponding client device fitting public key. If the digital signature is not successfully verified using the alleged public key, the hearing device may disregard the client device certificate and/or abort normal operation. This may provide the advantage that the hearing device rejects a client device certificate that is tampered or received from unauthenticated parties. The communication with the hearing device may thus be robust against impersonation, modification and masquerading attacks.

The authentication message may comprise an authentication type identifier. To select a hearing device key from a plurality of hearing device keys may be based on the authentication type identifier. An authentication type identifier may be indicative of a client device type identifier and/or a certificate type identifier, e.g. of the (encrypted) client device certificate. The client device may be attributed a client device type corresponding to a model, category or type of client devices, such as a fitting type, e.g. a tablet product model, category or type configured for fitting the hearing device, a USB dongle product model, category or type configured for fitting the hearing device. A client device type identifier may refer to an identifier indicative of a client device type. A client device type identifier may uniquely identify a client device type. A client device type identifier may identify a type which the client device belongs to. The client device type identifier may be comprised in the client device certificate. The hearing device may be configured to select the hearing device key corresponding to the authentication type identifier and/or the authentication key identifier.

The client device data may comprise an encrypted client device certificate; and the processing unit may be configured to generate a certificate key based on the selected hearing device key and/or the session identifier. To verify the client device data may comprise to decrypt the encrypted client device certificate with the certificate key to obtain a decrypted version of the encrypted client device certificate. The encrypted client device certificate may be generated by the client device using an encryption algorithm and a certificate key.

The hearing device may be configured to decrypt the encrypted client device certificate using a certificate key, a common secret and/or a hearing device key. The certificate key may be based on a common secret and/or a certificate value. The hearing device may be configured to obtain and/or generate the common secret based on a hearing device key, such as the selected hearing device key. For example, to generate the common secret based on the hearing device key, the hearing device may retrieve from the memory unit the hearing device key and/or the hearing device certificate from the memory unit, the hearing device certificate comprising a hearing device key, which is to be used for derive the common secret. The hearing device may be configured to store the common secret in the memory unit, so as to e.g. retrieve the common secret from the memory unit when needed.

The hearing device may be configured to generate the common secret based on a session identifier using the processing unit and to store the common secret in the memory unit. For example, the hearing device may generate a common secret based on a hearing device key, e.g. the selected hearing device key, and a session identifier. The hearing device may generate the common secret CS, e.g. as follows:

CS=hash(HD_KEY, S_ID), where hash is a hash function, HD_KEY is the (selected) hearing device key and S_ID is a session identifier. The session identifier may be generated by the hearing device upon reception of a connection request. The session identifier may comprise a random or pseudo random number of a defined length. The common secret may be used as a certificate key in one or more exemplary hearing devices.

The certificate key may be based on the common secret, e.g. generated by performing a hash function on the common secret and/or a certificate value. The hearing device may then generate the certificate key e.g. as follows:

C_KEY=hash(CS, C_VAL), where hash is a hash function, CS is the common secret and C_VAL is a certificate value. The certificate value may be a predefined value or string, such as "certificate".

In one or more exemplary hearing devices, the certificate key may optionally be generated by performing a hash function on the hearing device key and the session identifier. The hearing device may decrypt the encrypted client device certificate (part of the client device data) using the certificate key generated by the hearing device and obtain the decrypted version of the client device certificate. The hearing device may verify the content of the decrypted version of the client device certificate.

In one or more exemplary hearing devices, to verify the client device data comprises to determine if the authentication key identifier matches a client device key identifier of the client device certificate, and verification fails if no match is determined.

For example, the hearing device may be configured to verify that the authentication key identifier matches a corresponding client device key identifier comprised in the client device certificate. For example, the hearing device may be configured to verify that the authentication key identifier has a value that is equal to the client device key identifier comprised in the client device certificate. For example, the hearing device may be configured to verify that the authentication key identifier matches a corresponding client device key identifier comprised in the decrypted version of the client device certificate.

In one or more exemplary hearing devices, to verify the client device data comprises to determine if a client device type identifier of the client device certificate is valid and verification fails if the client device type identifier of the client device certificate is not valid. For example, the hearing device may be configured to verify that the authentication type identifier matches a corresponding client device type identifier comprised in the decrypted version of the client device certificate.

In one or more exemplary hearing devices, to determine if a client device type identifier of the client device certificate is valid comprises to determine if the client device type identifier is black-listed, wherein the client device type is not valid if the client device type identifier is black-listed, e.g. appears on a list of black-listed client device types. In one or more exemplary hearing devices, to determine if a client device type identifier of the client device certificate is valid comprises to determine if the client device type identifier is allowed, wherein the client device type is valid if the client device type identifier is allowed, e.g. appears on a list of allowed client device types. For example, the client device type identifier of the client device may be valid if the authentication type identifier matches a corresponding client device type identifier comprised in the decrypted version of the client device certificate.

In one or more exemplary hearing devices, to verify the client device data comprises to verify a digital signature of the client device certificate, and verification fails if the digital signature is not verified. For example, the client device data comprises a digital signature appended to it to protect integrity of the client device data. Verifying a digital signature comprises e.g. computing a comparison result based on the digital signature and a corresponding client device public key and comparing the comparison result to the received client device data/client device certificate. The corresponding client device public key may be retrieved by the hearing device from the memory unit, a remote data storage unit, and/or the server device. The digital signature may be verified as valid, or the verification is successful when the digital signature raised to the power of the client device public key is identical to the received client device data.

In one or more exemplary hearing devices, the client device certificate comprises a signing device identifier and/or a client device identifier. The client device identifier refers to an identifier identifying a client device. The client device identifier may for example comprise a medium access control, MAC, address of the client device, and/or a serial number of the client device. The hearing device may be configured to verify the client device data by determining if the signing device identifier and/or the client device identifier are valid. For example, the hearing device may be configured to determine if the signing device identifier is valid by verifying that the signing device identifier is not black-listed. For example, the hearing device may be configured to determine if the client device identifier is valid by verifying that the client device identifier is not black-listed. The client device identifier allows for example the hearing device to identify the client device amongst a plurality of client devices. Verification fails if the signing device identifier and/or the client device identifier are not valid. For example, if the hearing device determines that the signing device identifier and/or the client device identifier are black-listed, the signing device identifier and/or the client device identifier are not valid and verification fails.

In one or more exemplary hearing devices, the processing unit is configured to receive an additional authentication message. The additional authentication message may comprise client device data and/or an authentication device identifier. The authentication device identifier may refer to an identifier enabling authentication of the client device, such as a client device identifier comprised in an authentication message. For example, the authentication device identifier comprises a serial number, a medium access control, MAC, address, or any combination thereof. The hearing device may be configured to verify the authentication message and authenticate the client device sending the authentication message. The processing unit may be configured to obtain a common secret based on the authentication device identifier from the memory unit. The memory unit may have client device identifiers associated with common secrets stored thereon. The processing unit may then be configured to retrieve the corresponding common secret based on the authentication device identifier. The common secret has been generated and stored earlier at e.g. an initial round of authentication of a returning client device. Thus, once the client device authenticated, the processing unit can just retrieve the corresponding common secret. This provides a faster subsequent authentication, and avoids having to regenerate the common secret for computing the additional certificate key, and thus saves the corresponding power consumption. The processing unit may be configured to generate an additional certificate key from the common secret; and to verify the client device data based on the additional certificate key. For example, the processing unit may generate the additional certificate key by computing a hash value based on the common secret and a certificate value. As described above, the processing unit may be configured to verify the client device data based on the additional certificate key by verifying the integrity of the client device data, such as verifying a MAC and/or a digital signature of the client device data. The processing unit is configured to verify the client device data based on the additional certificate key by decrypting the client device data using the additional certificate key (as a decryption key), when the client device data is received encrypted. The processing unit is configured to verify the client device data by verifying the content of the client device data. The processing unit may be configured to verify the client device data based on the additional certificate key by comparing the client device data with data stored in the memory unit.

In one or more exemplary hearing devices, the processing unit is configured to generate an offline session key based on the common secret and the session identifier, and the processing unit is configured to communicate with the client device using the offline session key. An offline session key may be used to secure offline communication between the hearing device and a client device. Offline communication refers to a communication that does not involve any other network device (e.g. a server device). To generate an offline session key may comprise to generate an offline key based on the common secret (e.g. perform a hash function of the common secret and an offline value), and to compute the offline session key based on the offline key and the session identifier (e.g. perform a hash function of the offline key and the session identifier). The offline session key is used by the hearing device and the client device to secure (e.g. encrypt) the hearing device data communicated between the hearing device and the client device.

In one or more exemplary hearing devices, the authentication message comprises an authentication token identifier, and the processing unit is configured to store the authentication token identifier in the memory unit and to link the authentication token identifier with the common secret. The authentication token identifier may be indicative of enabling a token-based authentication at the hearing device, i.e. when the hearing device receives an authentication token identifier from an authenticated client device, it may enable token-based authentication in future communication with the same client device by storing e.g. an indicator such as a flag in relation with the common secret and the client. For example, the hearing device receiving the authentication token identifier may be configured to indicate to the processing unit to enable token-based authentication by storing and/or linking the token identifier with the common secret generated for the same client device, such as by storing and/or linking the token identifier with the common secret and the client device identifier of the same client device in e.g. a table. Token identifiers and token-based authentication may be used for hearing device management, such as to group hearing devices within a clinic or shop, and permit further fitting with minimal or no user physical interaction/intervention as well as possibly simpler and faster client device authentication. The client device for example accesses securely a data storage where the token identifier is securely stored in a first session, retrieves the credential and keying material to perform token-based authentication in a subsequent session. This way, any client device in e.g. a clinic or shop can be used to perform fitting in a secure way using token-based authentication.

In one or more exemplary hearing devices, the processing unit is configured to receive a further authentication message comprising client device data, an authentication type identifier, an authentication key identifier and/or an authentication session token identifier. The further authentication message may comprise an authentication device identifier. The processing unit may be configured to find in the memory unit the common secret linked to the client device type identifier and/or the client device identifier of the client device that sends the further authentication message based on locating the stored client device type identifier corresponding to the authentication type identifier and/or locating the stored client device identifier corresponding to the authentication device identifier. The processing unit may be configured to obtain a common secret based on the authentication type identifier; to generate a token key based on the common secret; and to generate a session token identifier based on the token key and the session identifier. The processing unit may have generated in an earlier session with the client device a common secret to e.g. establish a certificate key and may have stored and linked the common secret to the client device type identifier and/or the client device identifier. The processing unit may then be configured to obtain the common secret based on the authentication type identifier and/or the authentication client identifier corresponding to the stored client device type identifier and/or client device identifier. The processing unit may be configured to generate a token key by performing a hash function on the common secret and a token value (such as a pre-defined arbitrary string or a pre-defined arbitrary value). The processing unit may be configured to generate a session token identifier based on the token key and the session identifier by generating a session identifier, and by performing a hash function on the token key and the session identifier. The processing unit may be configured to verify the authentication session token identifier based on the session token identifier. The processing unit may be configured to verify the authentication session token identifier by comparing the authentication session token identifier and the generated session token identifier. For example, if the processing unit determines that the authentication session token identifier matches the generated session token identifier, the verification is successful and the processing unit may proceed with no user physical intervention, and continue to verify the client device data provided in the further authentication message. The client device data may comprise a client device certificate. The hearing device may verify the client device certificate (and/or check against a blacklist) for any fitting to be allowed. The verified authentication token identifier may for example be used to indicate to the hearing device that the client device holds the previous shared token key and therefore is allowed to fit exactly this hearing device without physical hearing device user intervention.

In one or more exemplary hearing devices, the processing unit is configured to generate a session key based on the session identifier and the hearing device key, and the processing unit is configured to receive and authenticate session data based on the session key. To generate a session key based on the session identifier and the hearing device key may comprise computing the session key by generating a common secret based on the hearing device key and the session identifier and optionally generating a hash value of the common secret and a session value, the generated hash value corresponding to the session key. For example, the processing unit is configured to authenticate session data based on the session key by verifying a MAC generated with the session key and/or by decrypting session data using the session key.

The present disclosure relates to a method of operating a hearing device comprising a processing unit configured to compensate for hearing loss of a user of the hearing device, a memory unit, and an interface, such as a method for controlling communication of a hearing device, such as a method for enabling secure hearing device communication. The method comprises receiving a connection request for a session via the interface. The connection request may comprise an authentication key identifier and/or an authentication type identifier, in order to permit the hearing device to perform authentication at this early stage the connection request and the client device sending the connection request. This may provide a level of access control.

The method comprises obtaining a session identifier, e.g. with the hearing device. Obtaining a session identifier may comprise generating a session identifier, such as by generating a random or pseudo-random number. For example, the processing unit generates a random or pseudo-random number of a predetermined length, e.g. 16 bytes, 32 bytes, 64 bytes etc., to be used as a session identifier. Obtaining a session identifier may comprise retrieving a session identifier from the memory unit. The method may comprise storing the session identifier in the memory unit. For example, storing the session identifier in the memory unit comprises storing the session identifier at a memory address of the memory unit, and/or in memory cells of the memory unit, such as in designated memory cells and/or at designated addresses.

The method comprises transmitting via the interface a connection response comprising a hearing device identifier and the session identifier. Transmitting the connection response may comprise generating the connection response by including the session identifier and the hearing device identifier and transmitting the thus generated connection response to e.g. the client device.

The method comprises receiving, via the interface, an authentication message. The authentication message may comprise an authentication key identifier and/or client device data. The method may comprise receiving, via the interface, an authentication message from a client device. For example the hearing device receives the authentication message from the client device in order to establish a communication session. The client device data may comprise a client device certificate, fitting data, hearing device operating parameters, and/or firmware data. The authentication key identifier may be an identifier that may be used to verify if the client device provides an authentication key identifier acceptable by the hearing device.

The method comprises selecting a hearing device key from a plurality of hearing device keys in the memory unit, e.g. based on the authentication key identifier. When the authentication key identifier matches the hearing device key identifier held by the hearing device and/or is indicative of a hearing device key of the hearing device, the processing unit may be configured to use the authentication key identifier as a key identifier indicating which hearing device key is to be used as keying material in the session. Selecting a hearing device key from a plurality of hearing device keys in the memory unit may be based on the authentication key identifier and/or an authentication type identifier. The authentication type identifier may be received in plaintext by the hearing device, and/or as client device type identifier in the client certificate (encrypted or decrypted). For example, the processing unit selects a hearing device key which the authentication key identifier and the authentication type identifier indicate.

The method comprises verifying the client device data, e.g. based on the selected hearing device key. Verifying the client device data may be based on a hearing device certificate or at least parts thereof. Further, the method may comprise terminating the session if verification fails. Verifying the client device data based on the selected hearing device key may comprise verifying the integrity of the client device data based on the selected hearing device key, such as verifying a MAC and/or a digital signature comprised in the client device data. Verifying the client device data based on the selected hearing device key may comprise decrypting the client device data using the selected hearing device key (as keying material to derive a decryption key or as a decryption key), when the client device data is received encrypted. Verifying the client device data based on the selected hearing device key may comprise verifying the client device data by comparing the received client device data, e.g. decrypted client device certificate, with data stored in the memory unit. For example, verification fails if integrity of the client device data is detected as corrupted by e.g. verifying a MAC or a digital signature, if decryption fails, and/or if comparison of the received client device data with data stored in the memory unit shows a mismatch.

The authentication message optionally comprises an authentication type identifier. An authentication type identifier may be indicative of a client device type identifier and/or a certificate type identifier. Selecting a hearing device key from a plurality of hearing device keys may be based on the authentication type identifier. Selecting the hearing device key may be based on the authentication type identifier provided in the authentication message and/or the authentication key identifier verified.

The client device data may comprise a client device certificate (such as an encrypted client device certificate), an authentication key identifier, and/or an authentication type identifier. The client device may be assigned a client device certificate.

The method may comprise generating a certificate key based on the selected hearing device key and/or the session identifier; and verifying the client device data may comprise decrypting the encrypted client device certificate with the certificate key to obtain a decrypted version of the encrypted client device certificate. Decrypting the encrypted client device certificate with the certificate key may comprise decrypting the encrypted client device certificate using a certificate key, a common secret and/or a hearing device key, such as generating a certificate key based on a common secret, and processing the encrypted client certificate using a decryption function and a certificate key. The certificate key may be based on a common secret and/or a certificate value. Generating a certificate key may comprise obtaining or generating the common secret based on the selected hearing device key. For example, generating the common secret based on the hearing device key comprises retrieving the hearing device certificate from the memory unit, the hearing device certificate comprising the selected hearing device key, and/or retrieving the selected hearing device key from the memory unit. The method may comprise generating the common secret based on a session identifier and/or the hearing device key. For example, the common secret CS is generated based on a selected hearing device key and a session identifier, e.g. as follows:

CS=hash(HD_KEY, S_ID), where hash is a hash function, HD_KEY is the selected hearing device key and S_ID is a session identifier. The session identifier may comprise a random or pseudo random number of a defined length. The common secret may be used as a certificate key in one or more exemplary hearing devices. The hearing device may be configured to store the common secret in the memory unit, so as to e.g. retrieve the common secret from the memory unit when needed.

Generating a certificate key may comprise performing a hash function on the common secret and/or a certificate value. The hearing device may then generate the certificate key e.g. as follows:

C_KEY=hash(CS, C_VAL), where hash is a hash function, CS is the common secret and C_VAL is a certificate value. The certificate value may be a predefined value or string, such as "certificate".

In one or more exemplary methods, generating a certificate key comprises performing a hash function on the hearing device key and the session identifier. Stated differently, the common secret may be used as a certificate key if the client device has also used the common secret as certificate key to encrypt the client device certificate.

Verifying the client device data may comprise decrypting the encrypted client device certificate using the certificate key generated by the hearing device and obtaining the decrypted version of the client device certificate.

In one or more exemplary methods, verifying the client device data may comprise verifying a content of the decrypted version of the client device certificate. For example, verifying the client device data comprises determining if the authentication key identifier matches a client device key identifier of the client device certificate, and verification fails if no match is determined.

In one or more exemplary methods, verifying the client device data comprises determining if a client device type identifier of the client device certificate is valid and verification fails if the client device type identifier of the client device is not valid. For example, an authentication type identifier is sent in plain text in the authentication message, the authentication type identifier sent in plain text is valid if the authentication type identifier matches a corresponding client device type identifier comprised in the decrypted version of the client device certificate. For example, determining if a client device type identifier of the client device certificate is valid may comprise determining if the client device type identifier of the client device certificate is comprised in a list of authorized client devices.

In one or more exemplary methods, determining if a client device type identifier of the client device certificate is valid comprises determining if the client device type identifier is black-listed, wherein the client device type is not valid if the client device type identifier is black-listed, e.g. appears on a list of black-listed client device types. In one or more exemplary methods, determining if a client device type identifier of the client device certificate is valid comprises determining if the client device type identifier is allowed, wherein the client device type is valid if the client device type identifier is allowed, e.g. appears on a list of allowed or authorized client device types.

In one or more exemplary methods, verifying the client device data comprises verifying a digital signature of the client device certificate, and verification fails if the digital signature is not verified. For example, the client device data comprises a digital signature appended to it to protect integrity of the client device data. Verifying a digital signature comprises e.g. computing a comparison result based on the digital signature and a corresponding public key and comparing the comparison result to the received client device data. The digital signature may be verified as valid, or the verification may be successful when the digital signature raised to the power of the public key is identical to the received client device data.

In one or more exemplary methods, the client device certificate comprises a signing device identifier and/or a client device identifier, and verifying the client device data comprises determining if the signing device identifier and/or the client device identifier is valid and wherein verification fails if the client device identifier of the client device and/or the signing device identifier is not valid.

In one or more exemplary methods, determining if a client device identifier of the client device certificate is valid comprises determining if the client device identifier is black-listed, wherein the client device identifier is not valid if the client device identifier is black-listed, e.g. appears on a list of black-listed client devices. In one or more exemplary methods, determining if a client device identifier of the client device certificate is valid comprises determining if the client device identifier is allowed, wherein the client device type is valid if the client device identifier is allowed, e.g. appears on a list of allowed or authorized client devices.

In one or more exemplary methods, the method comprises receiving an additional authentication message comprising client device data and/or an authentication device identifier. The method may further comprise obtaining, from the memory unit, a common secret based on the authentication device identifier, generating an additional certificate key from the common secret, and verifying the client device data based on the additional certificate key.

In one or more exemplary methods, the method comprises generating an offline session key based on the common secret and the session identifier, and communicating with the client device using the offline session key.

In one or more exemplary methods, the method comprises receiving a further authentication message comprising client device data, an authentication type identifier, an authentication key identifier and/or an authentication session token identifier. The further authentication message may comprise an authentication device identifier. The method may comprise finding or determining in the memory unit the common secret linked to the client device type identifier and/or the client device identifier of the client device that sends the further authentication message based on locating the stored client device type identifier corresponding to the authentication type identifier and/or locating the stored client device identifier corresponding to the authentication device identifier. The method may comprise obtaining a common secret based on the authentication type identifier; generating a token key based on the common secret; and generating a session token identifier based on the token key and the session identifier. The processing unit may have generated in an earlier session with the client device a common secret to e.g. establish a certificate key and may have stored and linked the common secret to the client device type identifier and/or the client device identifier. The method may comprise obtaining the common secret based on the authentication type identifier and/or the authentication client identifier corresponding to the stored client device type identifier and/or client device identifier. The method may comprise generating a token key by performing a hash function on the common secret and a token value (such as a pre-defined arbitrary string or a pre-defined arbitrary value). The method may comprise generating a session token identifier based on the token key and the session identifier by generating a session identifier, and by performing a hash function on the token key and the session identifier. The method may comprise verifying the authentication session token identifier based on the session token identifier. The method may comprise verifying the authentication session token identifier by comparing the authentication session token identifier and the generated session token identifier. For example, if it is determined that the authentication session token identifier matches the generated session token identifier, the verification is successful and the processing unit may proceed with no user physical intervention, and continue to verify the client device data provided in the further authentication message. The client device data may comprise a client device certificate. The hearing device may verify the client device certificate (and check against a blacklist) for any fitting to be allowed. The verified authentication token identifier may for example be used to indicate to the hearing device that the client device holds the previous shared token key and therefore is allowed to fit exactly this hearing device without physical hearing device user intervention.

In one or more exemplary methods, the method comprises generating a session key based on the session identifier and the hearing device key, receiving and authenticating session data based on the session key.

FIG. 1 schematically illustrates exemplary devices that may be used for manufacturing, maintenance, and/or operating a hearing device 2. FIG. 1 shows an exemplary system 1 and a hearing device 2. The system 1 may comprise one or more of a manufacturing device 12, a client device 10, and a server device 16 for manufacturing, maintenance, and/or operating the hearing device 2 in connection with hearing loss compensation (such as for fitting the hearing device, for updating a hearing device parameter).

The manufacturing device 12 may be configured to perform any steps of the method of manufacturing a hearing device. The manufacturing device 12 may be configured to generate a hearing device certificate including the hearing device identifier and at least one of the generated hearing device keys. The manufacturing device 12 may be configured to transmit the hearing device certificate to the hearing device. The manufacturing device 12 may comprise processing elements (such as a processor and a memory)

The hearing device 2 may be configured to compensate for hearing loss of a user of the hearing device 2. The hearing device 2 may be configured to communicate with the manufacturing device 12 using e.g. a communication link 23, such as a uni or bi-directional communication link. The communication link 23 may be a wired link and/or wireless communication link. The communication link 23 may be a single hop communication link or a multi-hop communication link. The wireless communication link may be carried over a short-range communication system, such as Bluetooth, Bluetooth low energy, IEEE 802.11, Zigbee.

The hearing device 2 may be configured to connect to the client device 10 via a communication link 21, such as a bidirectional communication link. The communication link 21 may be a wired link and/or wireless communication link. The communication link 21 may be a single hop communication link or a multi hop communication link. The wireless communication link may be carried over a short-range communication system, such as Bluetooth, Bluetooth low energy, IEEE 802.11, Zigbee. The hearing device 2 may be configured to connect to the client device 10 over a network. The client device 10 may permit remote fitting of the hearing aid device where a dispenser connects to the hearing device via the client device 10 of the user. The client device 10 may comprise a computing device acting as a client, such as a fitting device 14 (e.g. a handheld device, a relay, a tablet, a personal computer, a mobile phone, and/or USB dongle plugged in a personal computer). The processing unit/hearing device is configured to receive a connection request for a session via the interface; and to obtain a session identifier. For example, the interface of the hearing device 2 is configured to receive the connection request from the client device 10 via communication link 21. For example the hearing device 2 receives the connection request from the client device 10 for establishing a communication session. The processing unit of the hearing device is configured to transmit via the interface a connection response comprising a hearing device identifier and/or the session identifier. The processing unit of the hearing device is configured to receive, via the interface, an authentication message comprising an authentication key identifier and/or client device data, e.g. from the client device 10 via communication link 21.

The client device 10 may be configured to communicate with the server device 16 via a communication link 24, such as a bidirectional communication link. The communication link 24 may be a wired link and/or wireless communication link. The communication link 24 may comprise a network, such as the Internet.

The client device 10 may be configured to communicate with the server device 16 for maintenance, and update purposes. The server device 16 may comprise a computing device configured to act as a server, i.e. to serve requests from the client device 10 and/or from the hearing device 2. The server device 16 may be controlled by the hearing device manufacturer. The server device 16 may be configured to communicate with the manufacturing device 12 via a communication link 22 for manufacturing maintenance, and/or operational purposes. The server device 16 and the manufacturing device 12 may be co-located and/or form one entity for manufacturing maintenance, and/or operational purposes of the hearing device 2.

Figure 2:
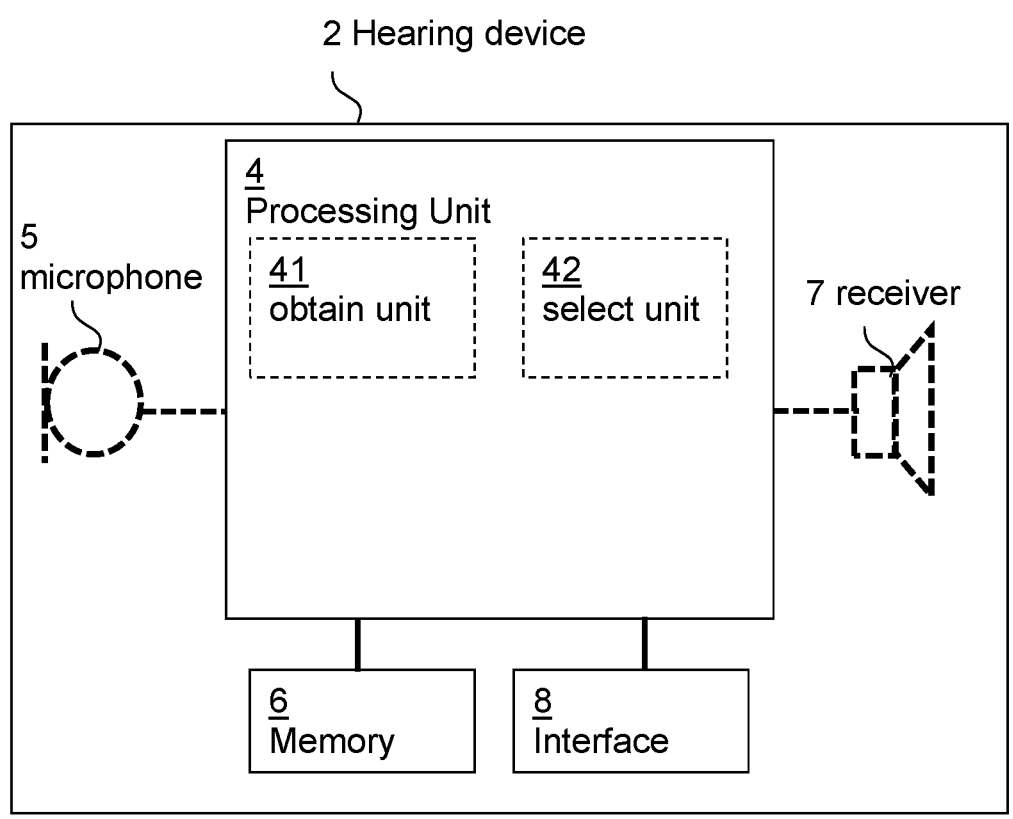

FIG. 2 schematically illustrates an exemplary hearing device 2. The hearing device 2 comprises a processing unit 4, a memory unit 6 and an interface 8. The hearing device 2 comprises a processing unit 4 configured to compensate for hearing loss of a user of the hearing device 2. The interface 8 comprises a wireless transceiver, e.g. configured for wireless communication at frequencies in the range from 2.4 to 2.5 GHz. The interface 8 is optionally configured for communication, such as wired and/or wireless communication, with a manufacturing device 12. The processing unit 4 may be configured to compensate for hearing loss of a user of the hearing aid according to data received during manufacture and/or fitting. The hearing device 2 optionally comprises a microphone 5 or a plurality of microphones for receiving sound signal(s) and converting sound signal(s) into converted sound signal. The converted sound signal may be an electrical and/or digital version of the sound signal. The processing unit 4 is configured to receive and process the converted sound signal into a processed sound signal according to a hearing loss of a user of the hearing device 2. The processed sound signal may be compressed and/or amplified or the like. The hearing device 2 comprises an output transducer/loudspeaker 7, known as a receiver. The receiver 7 is configured to receive the processed sound signal and convert it to an output sound signal for reception by an eardrum of the user.

The processing unit 4 is configured to receive a connection request for a session via the interface 8; and to obtain a session identifier. Hence, the processing unit 4 comprises e.g. an obtain unit 41 configured to obtain a session identifier. Examples of an obtain unit 41 include a random or pseudo-random number generator. The interface is configured to receive the connection request for a session from a client device 10. The processing unit 4 is configured to obtain a session identifier, such as by generating a random or pseudo-random number. The processing unit 4 is configured to store the session identifier in the memory unit 6. The memory unit 6 may be configured to store the session identifier at a memory address of the memory unit 6, and/or in memory cells of the memory unit 6, such as in designated memory cells and/or at designated addresses. The connection request may comprise an authentication key identifier and/or an authentication type identifier, in order to permit the hearing device 2 to perform authentication at this early stage the connection request and the client device 10 sending the connection request. This may provide a level of access control.

The processing unit 4 is configured to transmit via the interface 8 a connection response comprising a hearing device identifier and the session identifier. The processing unit 4 may be configured to generate a connection response by including the session identifier and the hearing device identifier in the connection response. The hearing device identifier may refer to a unique identifier of the hearing device 2, such as a serial number, a MAC address, and/or hardware identifier of the hearing device 2. The interface 8 is configured to transmit the connection response to e.g. the client device 10.

The processing unit 4 is configured to receive, via the interface 8, an authentication message comprising an authentication key identifier and client device data. For example, the interface 8 may be configured to receive the authentication message from the client device 10. For example the hearing device 2 receives the authentication message from the client device 10 in order to establish a communication session. The client device data may comprise a client device certificate (encrypted or unencrypted), fitting data, hearing device operating parameters, and/or firmware data. For example, the authentication message may comprise an authentication key identifier in plain text. The authentication key identifier may be indicative of a hearing device key. The processing unit 4 that processes the authentication key identifier is configured to e.g. verify the authentication key identifier by comparing it to the hearing device key identifier stored e.g. in the memory unit 6 and determining the authentication key identifier as acceptable if the authentication key identifier is for example equal or higher than the hearing device key identifier stored.

The processing unit 4 is configured to select a hearing device key from a plurality of hearing device keys in the memory unit 6 based on the authentication key identifier. Hence, the processing unit 4 comprises e.g. a select unit 42 configured to select a hearing device key based on the authentication key identifier. When the authentication key identifier is acceptable by the hearing device 2 based on a hearing device key identifier held by the hearing device 2, the processing unit 4 is configured to select a hearing device key that the authentication key identifier indicates and to use the selected hearing device key as keying material used to secure the session. Optionally, the processing unit 4 may be configured to select a hearing device key from a plurality of hearing device keys in the memory unit 6 based on the authentication key identifier and an authentication type identifier. The authentication type identifier may be included in the authentication message and received in plaintext by the hearing device 2, and/or as client device type identifier in the client certificate (encrypted or decrypted). For example, the processing unit 4 may be configured to select a hearing device key that the authentication key identifier and the authentication type identifier indicate.

Figure 3A:
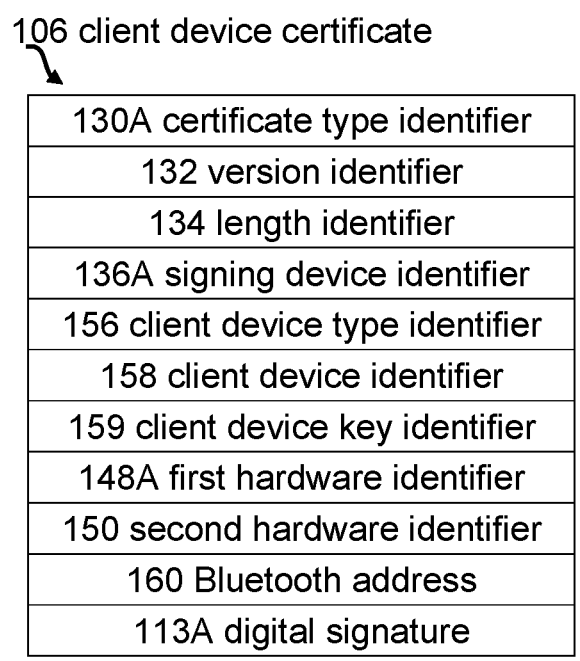

The processing unit 4 is configured to verify the client device data based on the selected hearing device key; and to terminate the session if verification fails. For example, the processing unit 4 is configured to verify the client device data based on the selected hearing device key by verifying the integrity of the client device data based on the selected hearing device key, such as verifying a MAC and/or a digital signature of the client device data. The processing unit 4 is configured to verify the client device data based on the selected hearing device key by decrypting the client device data using the selected hearing device key (as keying material to derive a decryption key or as a decryption key), when the client device data is received encrypted, and by verifying the content of the decrypted client device data. The processing unit 4 may be configured to verify the client device data based on the selected hearing device key by comparing the decrypted client device data with data stored in the memory unit 6. The client device data may comprise a client device certificate (such as an encrypted client device certificate), an authentication key identifier, and/or an authentication type identifier. The client device 10 may be assigned a client device certificate. The client device certificate refers to a certificate generated and assigned to the client device by e.g. a manufacturing device 12. Examples of client device certificates are illustrated in FIG. 3A. The processing unit 4 may be configured to generate a certificate key based on the selected hearing device key and/or the session identifier. To verify the client device data may comprise to decrypt the encrypted client device certificate with the certificate key to obtain a decrypted version of the encrypted client device certificate.

The processing unit 4 may be configured to verify the client device data by determining if the authentication key identifier matches a client device key identifier of the (decrypted) client device certificate, and verification fails if no match is determined.

In one or more exemplary hearing devices, the processing unit 4 is configured to verify the client device data by determining if a client device type identifier of the client device certificate is valid and verification fails if the client device type identifier of the client device is not valid. The processing unit 4 is configured to verify the client device data by verifying a digital signature of the client device certificate included in the client device data, and verification fails if the digital signature is not verified.

The processing unit 4 may be configured to verify the client device data by determining if the signing device identifier and/or the client device identifier are valid, e.g. not black-listed.

In one or more exemplary hearing devices, the processing unit 4 is configured to generate an offline session key based on the common secret and the session identifier, and the processing unit 4 is configured to communicate with the client device using the offline session key.

In one or more exemplary hearing devices, the authentication message 421 comprises an authentication token identifier, and the processing unit 4 is configured to store the authentication token identifier in the memory unit 6 and to link the authentication token identifier with the common secret. The authentication token identifier may be indicative of enabling a token-based authentication at the hearing device 2, i.e. when the hearing device receives an authentication token identifier from an authenticated client device 10, it may enable token-based authentication in future communication with the same client device 10 by storing e.g. an indicator such as a flag in relation with the common secret and the client device. For example, the hearing device 2 receiving the authentication token identifier may be configured to indicate to the processing unit 4 to enable token-based authentication by storing and/or linking the token identifier with the common secret generated for the same client device 10, such as by storing and/or linking the token identifier with the common secret and the client device identifier of the same client device in e.g. a table.

In the hearing device 2, the processing unit 4 is configured to generate a session key based on the session identifier and the hearing device key, and the processing unit 4 is configured to receive and authenticate session data based on the session key.

In one or more exemplary hearing devices, the processing unit 4 is configured to receive an additional authentication message via the interface 8. The additional authentication message comprises client device data and an authentication device identifier. The processing unit 4 may be configured to obtain a common secret based on the authentication device identifier from the memory unit 6. The processing unit 4 may be configured to generate an additional certificate key from the common secret; and to verify the client device data based on the additional certificate key.

FIG. 3A schematically illustrates an exemplary client device certificate 106. The client device data may comprise a client device certificate 106 and/or an encrypted client device certificate 106A. The client device 10 may be assigned a client device certificate 106. The client device certificate 106 refers to a certificate generated and assigned to the client device 10 by e.g. a manufacturing device 12. The encrypted client device certificate 106A may be generated by the client device 10 using an encryption algorithm and a certificate key.

The client device certificate 106 comprises a certificate type identifier 130A. The certificate type identifier 130A may indicate a type of the certificate amongst a variety of certificate types, such as a hearing device family certificate type, a hearing device certificate type, a firmware certificate type, a research and development certificate type, client device certificate type. The certificate type identifier 130A may be used by the hearing device 2 to identify what type of certificate it receives, stores, and/or retrieves and to act accordingly. The client device certificate 106 may comprise a version identifier 132 which indicates a data format version of the client device certificate 106. The hearing device 2 may be configured to use the certificate type identifier 130A and/or the version identifier 132 to determine what type of data the certificate comprises, and/or what type of data is comprised in a field of the certificate. For example, the hearing device 2 determines based on the certificate type identifier 130A and/or version identifier 132 what field of the certificate 106 comprises a digital signature 113A, and/or which public key is needed to verify the digital signature 113A. It may be envisaged that there is a one-to-one mapping between the certificate type identifier 130A and the public-private key pair. It may be envisaged that the hearing device 2 obtains the corresponding public key, such as retrieves the corresponding public key from the memory unit 6, a remote data storage, and/or receives the corresponding public key from the client device 10 and/or a server device 16. The client device certificate 106 may comprise a signing device identifier 136A. The signing device identifier 136A refers to a unique identifier identifying the device (such as a client device 10, a server device 16, an integrated circuit card, a smart card, and/or a hardware security module thereof) that has signed the client device certificate 106, e.g. during manufacture of the client device. The signing device identifier 136A may for example comprise a medium access control, MAC, address of the signing device, and/or a serial number of the signing device. The signing device identifier 136A allows for example the hearing device 2 to determine whether the signing device is e.g. black listed or not, and thus to reject certificates signed by a signing device that is black listed. The client device certificate 106 may comprise one or more hardware identifiers, such as a first hardware identifier 148A, and a second hardware identifier 150. The hardware identifiers, 148A, 150 may identify a piece of hardware comprised in the client device 10, such as a radio chip comprised in the client device 10, and/or a digital signal processor of the client device 10. The hardware identifier (s) may be stored in a register of the piece of hardware comprised in the hearing device during manufacturing of the piece of hardware. The hardware identifier(s) may comprise a serial number, a medium access control, MAC, address, a chip identifier, or any combination thereof.

In one or more exemplary client device certificates, the client device certificate 106 comprises a client device type identifier 156. A client device type identifier 156 may be indicative of a type which the client device belongs to. The client device certificate 106 may comprise a client device identifier 158. The client device certificate may comprise a client device key identifier 159. A client device key identifier 159 may be indicative of the client device key used as keying material for securing a communication with an external party.

In one or more exemplary client device certificates, the client device certificate 106 comprises a Bluetooth address 160 of the client device.

The client device certificate 106 comprises a digital signature 113A. The digital signature 113A enables a proof or verification of authenticity of the client device certificate, such as verification of the signer legitimacy. The digital signature 113A is optionally generated by the manufacturing device 12 using a client device fitting private key. The hearing device 2 may be configured to verify the digital signature 113A when receiving the client device certificate comprising the digital signature 113A (i.e. receiving the authentication message comprising the encrypted client device certificate, and obtaining a decrypted version of the client device certificate 106B). The digital signature 113A is verifiable by the hearing device 2 using a corresponding client device fitting public key, which is e.g. stored in the memory unit 6. If the digital signature 113A is not successfully verified using the alleged public key, the hearing device 2 may disregard the client device certificate 106 (and authentication message) and/or abort normal operation/the session. This may provide the advantage that the hearing device 2 rejects a client device certificate 106 (and authentication message) that is tampered or received from unauthenticated parties. The communication with the hearing device 2 may thus be robust against impersonation, modification and masquerading attacks.

Figure 3B:
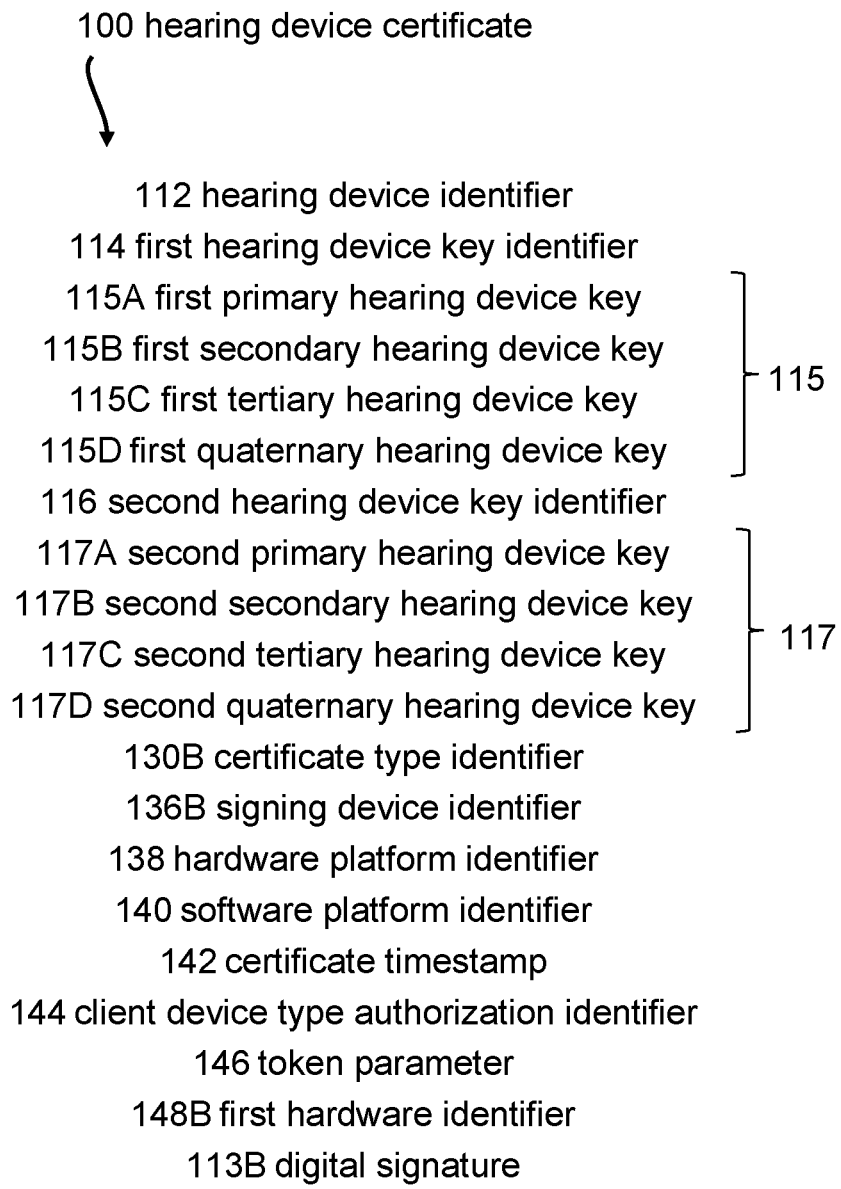

FIG. 3B schematically illustrates an exemplary hearing device certificate 100. The hearing device certificate 100 comprises a hearing device identifier 112, at least one hearing device key identifier including a first hearing device key identifier 114 indicative of a hearing device key and one or a plurality of hearing device keys. The hearing device identifier 112 may refer to a unique or a pseudo-unique identifier. The first hearing device key identifier 114 is indicative of the first hearing device key(s) of the hearing device certificate. For example, the first hearing device key identifier 114 may be indicative of or point to a hearing device key of a first set 115 of hearing device keys (115A, 115B, 115C, 115D) of the hearing device certificate, e.g. the first primary hearing device key 115A.

The hearing device certificate 100 optionally comprises at least four sets of hearing device keys enabling secure and distinct communication with at least four different client devices/client device types.

The hearing device certificate 100 comprises a first set 115 of hearing device keys including a first primary hearing device key 115A. The at least one hearing device key identifier comprises a first hearing device key identifier 114 indicative of a hearing device key of the first set 115 of hearing device keys 115A, 115B, 115C, 115D. The first set 115 of hearing device keys comprises for example first primary key 115A, first secondary key 115B, first tertiary key 115C, and first quaternary key 115D dedicated to securing communication to and from a first client device or a first client device type. For example, the first set 115 of hearing devices key may be a set of hearing device keys 115A, 115B, 115C, 115D for securing communication of hearing device data with the first client device.

The plurality of hearing device keys may comprise a second set 117 of hearing device keys including a second primary hearing device key 117A, a second secondary hearing device key 117B, a second tertiary hearing device key 117C, and/or a second quaternary hearing device key 117D. The at least one hearing device key identifier comprises a second hearing device key identifier 116 indicative of a hearing device key of the second set 117 of hearing device keys 117A, 117B, 117C, 117D. The hearing device is configured to communicate with one or more client devices, such as a first client device and/or a second client device. For each client device or client device type that the hearing device is configured to communicate with, the hearing device certificate optionally comprises a set of hearing device keys configured to enable secure communication with a specific client device or client device type, and a hearing device key identifier indicating which hearing device keys that are part of the hearing device certificate. The hearing device certificate may comprise a third set 119 of hearing device keys including a third primary hearing device key 119A, a third secondary hearing device key 119B, a third tertiary hearing device key 119C, and/or a third quaternary hearing device key 119D. The at least one hearing device key identifier comprises a third hearing device key identifier 118 indicative of a hearing device key of the third set 119 of hearing device keys. The hearing device certificate 100 may comprise a fourth set of hearing device keys including a fourth primary hearing device key (not shown). The at least one hearing device key identifier comprises a fourth hearing device key identifier indicative of a hearing device key of the fourth set of hearing device keys. The hearing device 2 may be configured to select a set of hearing device keys based on the client device or the client device type connected to the hearing device and to select a hearing device key from the set of hearing device keys selected based on the hearing device key identifier associated with the selected set of hearing devices.

The hearing device certificate 100 optionally comprises a certificate type identifier 130B. The certificate type identifier 130B indicates that the hearing device certificate 100 is a hearing device certificate, e.g. selected amongst a variety of certificate types, such as a hearing device family certificate type, a hearing device certificate type, a firmware certificate type, a research and development certificate type, and a client device certificate type. The certificate type identifier 130B may be used to enable the hearing device 2 to identify what type of certificate it receives, stores, authenticates and/or retrieves. The hearing device certificate 100 may comprise a version identifier which indicates a data format version of the hearing device certificate. The hearing device 2 may use the certificate type identifier 130B and/or the version identifier to determine what type of data the hearing device certificate 100 comprises, what type of data is comprised in a field of the hearing device certificate 100. For example, the hearing device 2 may determine based on the certificate type identifier 130B and/or version identifier what field of the certificate comprises a digital signature 113B, and which public key is needed to verify the digital signature 113B. It may be envisaged that there is a one-to-one mapping between the certificate type identifier 130B and the public-private key pair used for generating the digital signature 113B. The hearing device certificate 100 may comprise a length identifier that indicates the length of the hearing device certificate 100, e.g. in bits, bytes.

The hearing device certificate 100 optionally comprises a signing device identifier 136B. The signing device identifier 136B refers to a unique identifier identifying the device (such as a manufacturing device 12, e.g. an integrated circuit card, a smart card, a hardware security module comprised in a manufacturing device 12) that has signed the hearing device certificate 100. The signing device identifier 136B may for example comprise a medium access control, MAC, address of the signing device, a serial number. The signing device identifier 136B allows for example the hearing device 2 to determine whether the signing device is e.g. black-listed or not, and thus to reject hearing device certificates 100 signed by a signing device that is black-listed.

The hearing device certificate 100 optionally comprises one or more hardware identifiers including a first hardware identifier 148B and/or a second hardware identifier (not shown). The first hardware identifier 148B may identify a piece of hardware comprised in the hearing device 2, such as a processing unit 4, a radio chip comprised in the hearing device 2, a digital signal processor of the hearing device 2. The first hardware identifier 148B may also be stored in a register of the piece of hardware comprised in the hearing device 2 during manufacturing of the piece of hardware. The first hardware identifier 148B may comprise a serial number, a medium access control, MAC, address, a chip identifier, or any combination thereof. The hearing device certificate 100 may comprise a first hardware identifier 148B, a second hardware identifier and/or a third hardware identifier. For example, the first hardware identifier 148B may provide a first hearing device specific value present in a register of a hardware module (e.g. the processing unit or the radio chip) of the hearing device 2 while the second hardware identifier may provide a second hearing device specific value present in a register of a hardware module of the hearing device 2, and a third hardware identifier may provide a third hardware module identifier (e.g. a processing unit identifier, a DSP identifier). The hearing device 2, upon receiving the hearing device certificate 100 comprising the first hardware identifier 148B, may then verify the hearing device certificate 100 by comparing its stored hardware identifier and the first hardware identifier 148B comprised in the hearing device certificate 100 received. This way, the hearing device 2 may determine if the received hearing device certificate is intended for the hearing device 2 and reject the received hearing device certificate if the stored and received hardware identifiers do not match.

The hearing device certificate 100 optionally comprises a client device type authorization identifier 144. A client device type may comprise a model, category or type of client devices, such as a tablet product model, category or type, a USB dongle product model, category or type. The client device type authorization identifier 144 is an identifier of an authorized client device type, such as an identifier of the client device types that the hearing device 2 may authorize for communication, such as for fitting, maintenance and/or operation. The client device type authorization identifier 144 is for example a bit-field indicating the type of client device the hearing device 2 should allow for fitting.

The hearing device certificate 100 optionally comprises a token parameter 146. The token parameter 146 indicates whether a token-based authentication is to be enabled or not. For example, if the token parameter 146 is set to 0, token-based authentication of client devices is not to be enabled by the hearing device 2 and the hearing device 2 is to use for example a combination of client device type identifier and/or a client device identifier (such as a serial number) to perform an authentication of the client device 10. If for example the token parameter 146 is set to 1, token-based authentication of client devices is to be enabled by the hearing device 2, i.e. the hearing device 2 authenticates the client device 10 (such as a based on a token received from the client device 10). The hearing device 2 may also derive a session specific token based on the received token parameter 146 which is used to e.g. accept the connection to the client device 10 without user intervention.

The hearing device certificate 100 comprises one or more of a hardware platform identifier 138, a software platform identifier 140, and/or a certificate timestamp 142. The hardware platform identifier 138 may identify a hardware platform, such as an operational hearing device hardware platform, i.e. a hardware platform on which the hearing device certificate may be used. The software platform identifier 140 may identify a family of software platforms on which the hearing device certificate is configured to operate. The certificate timestamp 142 refers to a timestamp of production or manufacture of the hearing device certificate 100, such as a timestamp of the manufacturing device 12 indicating a time instant when the hearing device certificate 100 has been generated. The certificate timestamp 142 may be in form of e.g.: hour, min, date, month, year.

The hearing device certificate comprises a digital signature 113B and/or a MAC. The digital signature 113B enables a proof or verification of authenticity of the hearing device certificate 100, such as verification of the signer legitimacy (e.g. whether the signer is a legitimate manufacturing device). The digital signature 113B is generated by the manufacturing device 12 using a device family private key during manufacturing of the hearing device. The hearing device 2 or the processing unit 4 may then verify the digital signature 113B, e.g. when receiving the hearing device certificate 100 comprising the digital signature 113B. The digital signature 113B is verifiable by the hearing device 2 using a corresponding device family public key. If the digital signature 113B is not successfully verified using the alleged public key, the hearing device may disregard the hearing device certificate 100 and/or abort normal operation.

Figure 4:
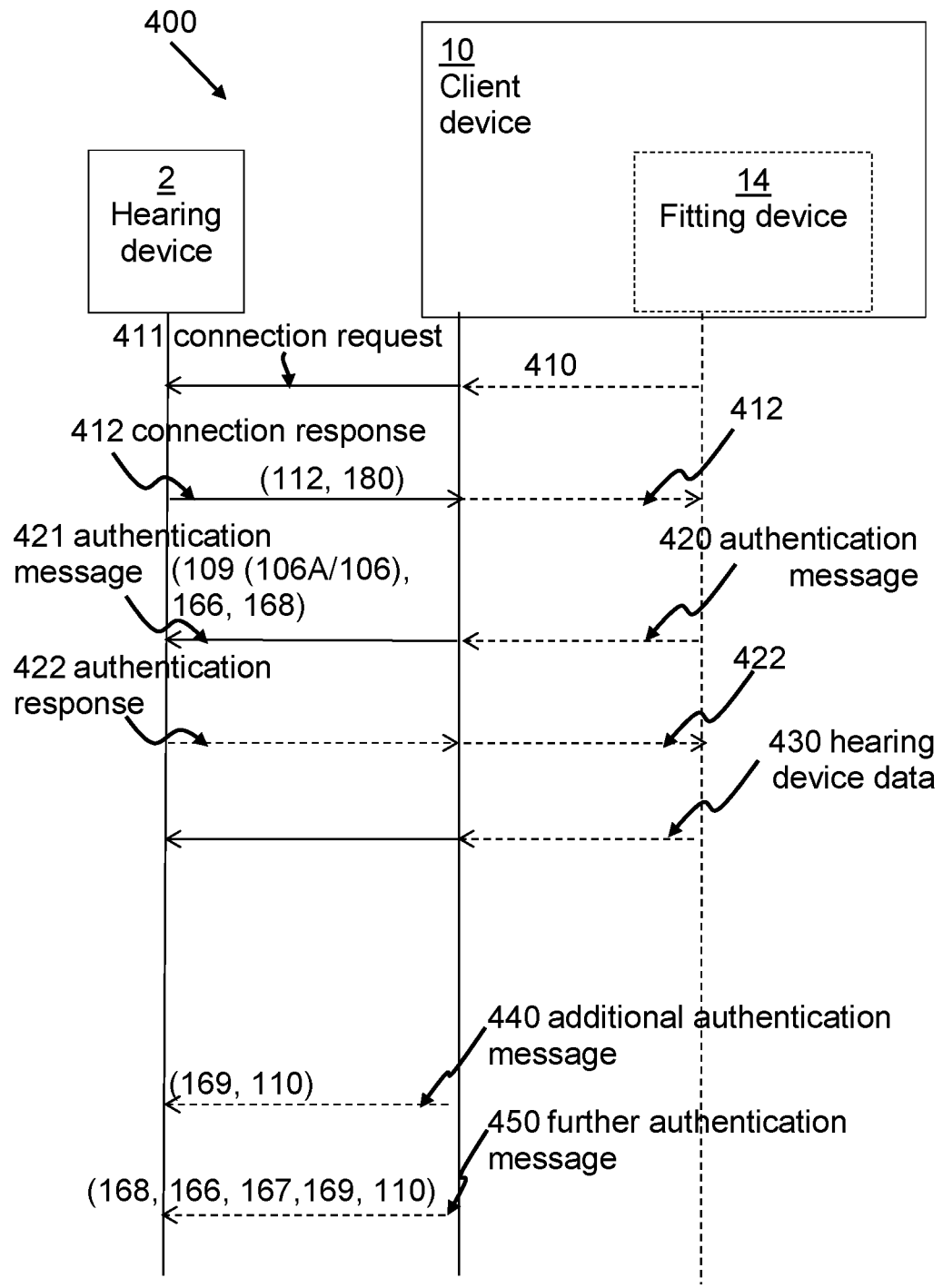

FIG. 4 schematically illustrates an exemplary signalling diagram 400 involving a hearing device 2, and a client device 10. The client device 10 may comprise a fitting device 14. The hearing device 2 receives via the interface 8 a connection request or message 411 for session from the client device 10. When the client device 10 comprises a fitting device 14, the fitting device 14 may generate a connection request 410, which is transmitted by the client device 10 as connection request 411. The hearing device 2 obtains a session identifier 180, such as generates a session identifier 180. The hearing device 2 generates a connection response 412 comprising a hearing device identifier 112 and/or a session identifier 180 and transmits the connection response 412 to the client device 10. When the client device 10 comprises a fitting device 14, the fitting device 10 may receive the connection response 412 via the client device 10. The client device 10 generates an authentication message 421 and transmits the authentication message 421 to the hearing device 2. The hearing device 2 receives the authentication message 421 from the client device 10. The authentication message 421 comprises an authentication key identifier 166, optional authentication type identifier 168, and client device data 109. The client device data 109 comprises an encrypted client device certificate 106A or client device certificate 106. Any of client device type identifier 156, client device identifier 158, and a user identifier may be comprised in the encrypted client device certificate 106A. Any of a client device identifier, a client device type identifier 156 and/or a user identifier may be comprised in the authentication message 421 in plain text, or as part of (plain) client device certificate 106. When the client device 10 comprises a fitting device 14, the fitting device 14 may generate an authentication message 420, which is transmitted by the client device 10 as authentication message 421.

Optionally, the hearing device 2 is configured to authenticate the authentication message 421 by verifying the content, origin and/or integrity of the authentication message 421. For example, the hearing device 2 verifies whether the received value of authentication key identifier 166 received is higher or equal to a hearing device key identifier comprised in the hearing device certificate 100 (and/or the latest value the hearing device 2 has stored as hearing device key identifier in e.g. a flash memory). If the hearing device 2 determines that the received value of authentication key identifier 166 received is higher or equal to a hearing device key identifier, the authentication continues, else the session is terminated immediately (with proper error code). This prevents the hearing device 2 to communicate with an expired/revoked client device.

For example, the hearing device 2 determines the type of client device based on authentication type identifier. The hearing device 2 selects a hearing device key from a plurality of hearing device keys based on the authentication type identifier 168 and/or the authentication key identifier 166. For example, the hearing device 2 identifies the hearing device key corresponding to the authentication key identifier 166 received. The hearing device 2 uses the identified hearing device key and the session identifier 180 (e.g. a 16 bytes of random number) sent in connection response 412 to the client device 10 to derive the certificate key, such as to compute a common secret from which the certificate key is derivable.

Using the certificate key, the hearing device 2 decrypts the encrypted client device certificate 106A. The hearing device 2 may then verify that the certificate type identifier 130A comprised in the decrypted client device certificate 106B corresponds to the right certificate 106B. The hearing device 2 may then verify that the authentication type identifier 168 received in plain text match the client device type identifier 156 in the decrypted certificate 106B. The hearing device 2 may then verify that the authentication key identifier 166 received in plain text match the client device key identifier 159 in the decrypted certificate 106B and may further assess if the authentication key identifier 166 and/or the client device key identifier 159 is indicative of a hearing device key identifier (such as a first hearing device key identifier 114) held by the hearing device 2. The hearing device 2 may then verify that the version identifier 132 in the decrypted certificate 106B is supported by the hearing device 2. The hearing device 2 may then verify that the authentication type identifier 168 received in plain text or the client device type identifier 156 is listed in the client device type authorization identifier 144 of the stored hearing device certificate 100. The hearing device 2 may then verify that the authentication type identifier 168 received in plain text or the client device type identifier 156 associated with the first hardware identifier 148A, 150 is not black-listed. The signing device identifier 136A is verified not to be listed on the blacklist. The hearing device 2 may then verify the digital signature 113A of the client device certificate 106B using the matching public key.

Upon successful authentication of the authentication message 421 and/or verification, the hearing device 2 may send an authentication response 422 to the client device 10 that may forward it to a fitting device 14 when the client device 10 comprises the fitting device 14.

The communication channel is now open and secure. The client device 10 or fitting device 14 via the client device 10 may send hearing device data 430 to the hearing device 2, such as hearing device data 430 in a session secured by a session key. Hearing device data 430 comprises e.g. firmware, fitting data, and/or hearing device operating parameters. Fitting data may for example be data generated by a fitting device 14 used by a dispenser when a hearing device 2 is being fitted in a user's ear. Fitting data may comprise hearing loss parameters, compressor parameters, filter coefficients, and/or gain coefficients. Hearing device operation parameters may comprise volume control parameters, mode and/or program control parameters. Firmware may refer to a computer program provided by the hearing device manufacturer, and to be installed on the hearing device 2 to control the hearing device 2. Firmware is for example to be installed to upgrade the operations and capabilities of the hearing device 2.

Optionally, for example when the client device 10 reconnects to the hearing device 2, the processing unit 4 may be configured to receive via the interface 8 an additional authentication message 440. The additional authentication message 440 comprises client device data 110 and an authentication device identifier 169. The processing unit 4 may be configured to verify the authentication message 440 and authenticate the client device sending the authentication message 440. The processing unit 4 may be configured to obtain, from the memory unit 6, a common secret based on the authentication device identifier 169. The memory unit 6 may have client device identifiers 158 associated with corresponding common secrets stored thereon, for authenticated client devices 10. The processing unit 4 may then be configured to retrieve the corresponding common secret based on the authentication device identifier 169. The common secret has been generated and stored earlier at e.g. an initial round of authentication of a returning client device 10. Thus, once the client device 10 authenticated, the processing unit 4 can just retrieve the corresponding common secret from the memory unit 6. This provides a faster subsequent authentication, and avoids having to regenerate the common secret for computing the additional certificate key, and thus saves the corresponding power consumption. The processing unit 4 may be configured to generate an additional certificate key from the common secret and to verify the client device data 110 based on the additional certificate key.

For example, the processing unit 4 generates the additional certificate key by computing a hash value based on the common secret and a certificate value. As described above, the processing unit 4 may be configured to verify the client device data 110 based on the additional certificate key by verifying the integrity of the client device data 110, such as verifying a MAC and/or a digital signature of the client device data 110. The processing unit 4 is configured to verify the client device data 110 based on the additional certificate key by decrypting the client device data 110 using the additional certificate key (as a decryption key), when the client device data 110 is received encrypted. The processing unit 4 is configured to verify the client device data 110 by verifying the content of the client device data 110. The processing unit 4 may be configured to verify the client device data by comparing the client device data 110 with data stored in the memory unit 6. The client device data 110 may comprise a client device certificate 106, such as an encrypted client device certificate 106A.

Optionally, the processing unit 4 is configured to receive a further authentication message 450 comprising client device data 110 and an authentication token identifier 167. The processing unit 4 is configured to obtain a common secret based on the authentication token identifier 167 from the memory unit 6; to generate a token key from the common secret.

In one or more exemplary hearing devices, the processing unit 4 is configured to receive a further authentication message 450 comprising client device data 110, an authentication type identifier 168, an authentication key identifier 166 and/or an authentication session token identifier 167. The further authentication message may comprise an authentication device identifier 169. The processing unit 4 may be configured to find in the memory unit 6 the common secret linked to the client device type identifier and/or the client device identifier of the client device 10 that sends the further authentication message 450 based on locating the stored client device type identifier corresponding to the authentication type identifier 168 and/or locating the stored client device identifier corresponding to the authentication device identifier 169. The processing unit 4 may be configured to obtain a common secret based on the authentication type identifier 168; to generate a token key based on the common secret; and to generate a session token identifier based on the token key and the session identifier. The processing unit 4 may have generated in an earlier session with the client device 10 a common secret to e.g. establish a certificate key and may have stored and linked the common secret to the client device type identifier and/or the client device identifier. The processing unit 4 may then be configured to obtain the common secret based on the authentication type identifier 168 and/or the authentication client identifier 169 corresponding to the stored client device type identifier and/or client device identifier. The processing unit 4 may be configured to generate a token key by performing a hash function on the common secret and a token value (such as a pre-defined arbitrary string or a pre-defined arbitrary value). The processing unit 4 may be configured to generate a session token identifier based on the token key and the session identifier by generating a session identifier, and by performing a hash function on the token key and the session identifier. The processing unit 4 may be configured to verify the authentication session token identifier based on the session token identifier. The processing unit 4 may be configured to verify the authentication session token identifier by comparing the authentication session token identifier 167 and the generated session token identifier. For example, if the processing unit determines that the authentication session token identifier 167 matches the generated session token identifier, the verification is successful and the processing unit 4 may proceed with no user physical intervention, and continue to verify the client device data 110 provided in the further authentication message 450. The client device data 100 may comprise a client device certificate, which may be verified according to this disclosure.

In one or more exemplary hearing devices, the hearing device is configured to support a special fitting, such as veteran administration, VA, fitting. The memory unit of the hearing device may have stored a special indicator indicating the type of special fitting, such as VA fitting.

Figure 5:
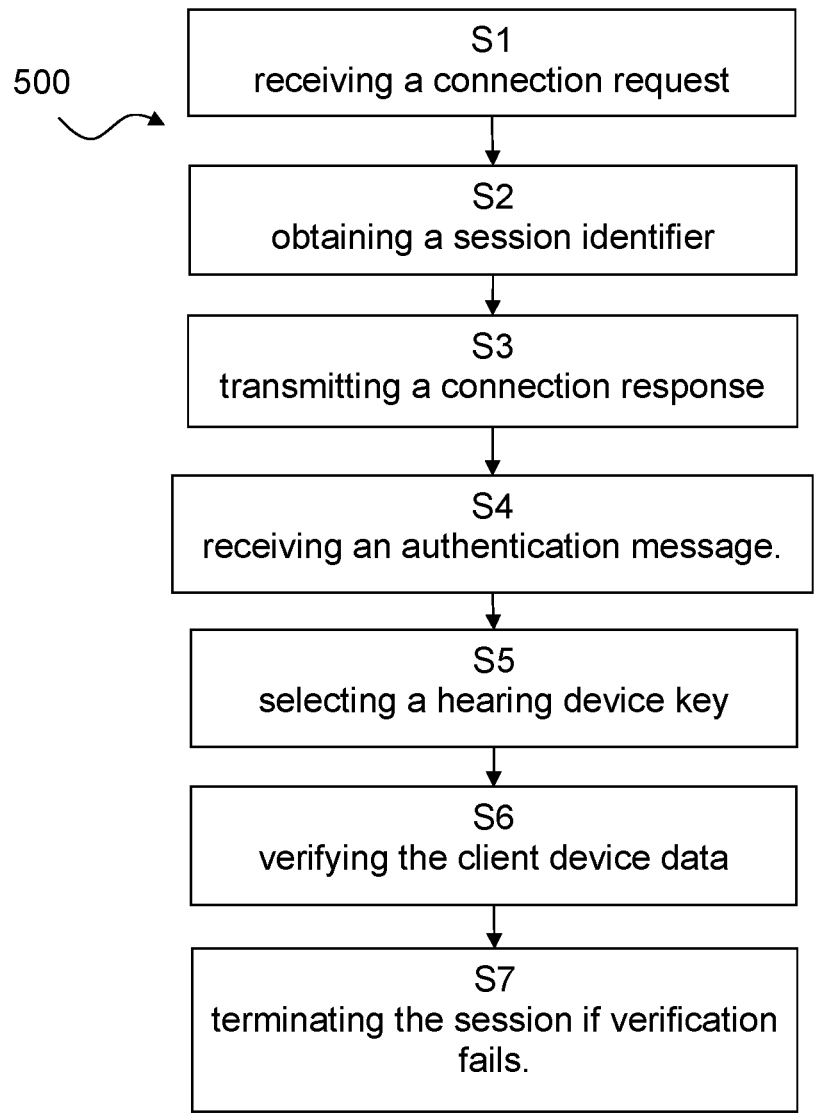

FIG. 5 schematically illustrates a flowchart of an exemplary method 500 of operating a hearing device 2. The hearing device 2 comprises a processing unit 4 configured to compensate for hearing loss of a user of the hearing device 2, a memory unit 6, and an interface 8. The method 500 comprises receiving S1 a connection request for a session via the interface 8. The connection request may comprise an authentication key identifier 166 and/or an authentication type identifier 168, in order to allow the hearing device 2 to perform authentication at this early stage the connection request and the client device sending the connection request. This may provide a level of access control.

The method 500 comprises obtaining S2 a session identifier 180, e.g. with the hearing device. Obtaining S2 a session identifier 180 may comprise generating a session identifier 180, such as by generating a random or pseudo-random number. For example, the processing unit 4 generates a random or pseudo-random number of a predetermined length, e.g. 16 bits, 32 bits, 64 bits etc., to be used as a session identifier 180. Obtaining S2 a session identifier 180 may comprise retrieving a session identifier 180 from the memory unit. The method 500 may comprise storing the session identifier 180 in the memory unit 6. For example, storing the session identifier 180 in the memory unit 6 comprises storing the session identifier 180 at a memory address of the memory unit 6, and/or in memory cells of the memory unit 6, such as in designated memory cells and/or at designated addresses.

The method 500 comprises transmitting S3 via the interface 8 a connection response comprising a hearing device identifier 112 and the session identifier 180. Transmitting S3 the connection response may comprise generating the connection response by including the session identifier 180 and the hearing device identifier 112 and transmitting the thus generated connection response to e.g. the client device 10.

The method 500 comprises receiving S4, via the interface 8, an authentication message. The authentication message comprises an authentication key identifier 166 and client device data 109. The method 500 may comprise receiving, via the interface 8, an authentication message 421 from a client device 10. For example the hearing device 2 receives the authentication message 421 from the client device 10 in order to establish a communication session. The client device data 109 may comprise a client device certificate, such as unencrypted client device certificate 106 or encrypted client device certificate 106A, fitting data, hearing device operating parameters, and/or firmware data. The authentication key identifier 166 may be an identifier that may be used to verify if the client device 10 has used a client device key acceptable by the hearing device 2.

The method 500 comprises selecting S5 a hearing device key from a plurality of hearing device keys (e.g. within or amongst a first set of hearing device keys 115, second set of hearing device keys 116 etc.) in the memory unit 6 based on the authentication key identifier 166. When the authentication key identifier 166 matches the hearing device key identifier, such as a first hearing device key identifier 114 held by the hearing device 2, the processing unit 4 may be configured to use the authentication key identifier 166 as a key identifier indicating which hearing device key is to be used as keying material in the session. Selecting S5 a hearing device key from a plurality of hearing device keys in the memory unit may be based on the authentication key identifier 166 and/or an authentication type identifier 168. The authentication type identifier 168 may be received in plaintext by the hearing device 2 as part of the authentication message 421, and/or as client device type identifier 156 in the client device certificate 106 (encrypted or decrypted). For example, selecting S5 comprises selecting a hearing device key that the authentication key identifier 166 and the authentication type identifier 168 indicate.

The method 500 comprises verifying S6 the client device data 109 based on the selected hearing device key and terminating S7 the session if verification fails. Verifying S6 the client device data 109 based on the selected hearing device key may comprise verifying the integrity of the client device data 109 based on the selected hearing device key, such as verifying a MAC and/or a digital signature comprised in the client device data 109. Verifying S6 the client device data 109 based on the selected hearing device key may comprise decrypting the client device data 109 using the selected hearing device key (as keying material to derive a decryption key or as a decryption key), when the client device data 109 is received encrypted. Verifying S6 the client device data 109 based on the selected hearing device key may comprise verifying the client device data 109 by comparing the received client device data 109 with data stored in the memory unit. For example, verification fails and the session is terminated if integrity of the client device data 109 is detected as corrupted by e.g. verifying a MAC or a digital signature, if decryption fails, and/or if comparison of the received client device data 109 (when decrypted if the client device data comprises encrypted data, such as encrypted client device certificate) with data stored in the memory unit, e.g. hearing device certificate, shows a mismatch or is indicative of corruption.

The authentication message optionally comprises an authentication type identifier 168. An authentication type identifier may be indicative of a client device type identifier 156 and/or a certificate type identifier 130, e.g. included in the client device data (encrypted). Selecting S5 a hearing device key from a plurality of hearing device keys may be based on the authentication type identifier 168. Selecting S5 the hearing device key may be based on the authentication type identifier 168 and/or the authentication key identifier 166 provided in the authentication message 421.

The client device data 109 may comprise a client device certificate 106 or an encrypted client device certificate 106A, an authentication key identifier 166, and/or an authentication type identifier 168. The method 500 may comprise generating S8 a certificate key based on the selected hearing device key and/or the session identifier 180; and verifying S6 the client device data 109 may comprise decrypting the encrypted client device certificate 106A with the certificate key to obtain a decrypted version 106B of the encrypted client device certificate 106A. Decrypting the encrypted client device certificate 106A with the certificate key may comprise decrypting the encrypted client device certificate 106A using a certificate key, a common secret and/or a hearing device key, such as generating a certificate key based on a common secret, and processing the encrypted client device certificate 106A using a decryption function and a certificate key. The certificate key may be based on a common secret and/or a certificate value. Generating a certificate key may comprise obtaining or generating the common secret based on the selected hearing device key. For example, generating the common secret based on the hearing device key comprises retrieving the hearing device certificate 100 from the memory unit 6, the hearing device certificate 100 comprising the selected hearing device key, and/or retrieving the selected hearing device key from the memory unit 6. The method may comprise generating the common secret based on a session identifier 180 and/or the selected hearing device key (e.g. the first primary hearing device key 115A). For example, the common secret CS is generated based on a selected hearing device key and a session identifier 180, e.g. as follows:

CS=hash(HD_KEY, S_ID), where hash is a hash function, HD_KEY is the selected hearing device key and S_ID is a session identifier 180. The session identifier 180 may comprise a random or pseudo random number of a defined length. The common secret may be used as a certificate key in one or more exemplary methods. The method 500 may comprise storing the common secret in the memory unit 6, so as to e.g. retrieve the common secret from the memory unit 6 when needed.

Generating a certificate key may comprise performing a hash function on the common secret and/or a certificate value. Generating the certificate key may be performed e.g. as follows:

C_KEY=hash(CS, C_VAL), where hash is a hash function, CS is the common secret and C_VAL is a certificate value. The certificate value may be a predefined value or string, such as the string "certificate".

In one or more exemplary methods, generating a certificate key comprises performing a hash function on the hearing device key (e.g. the first primary hearing device key 115A) and the session identifier 180. Stated differently, the common secret may be used as a certificate key if the client device has also used the common secret as certificate key to encrypt the client device certificate 106.

Verifying S6 the client device data 109 may comprise decrypting the encrypted client device certificate 106A using the certificate key generated by the hearing device 2 and obtaining the decrypted version 106B of the encrypted client device certificate 106A.

In one or more exemplary methods, verifying S6 the client device data 109 may comprise verifying a content of the decrypted version 106B of the encrypted client device certificate 106A, e.g. based on a hearing device certificate or at least parts thereof.

For example, verifying S6 (with the hearing device) the client device data 109 comprises determining if the authentication key identifier 166 matches a client device key identifier 159 of the client device certificate 106, and verification fails if no match is determined.

In one or more exemplary methods, verifying S6 the client device data 109 comprises determining if a client device type identifier 156 of the client device certificate 106 or 106B is valid and verification fails if the client device type identifier 156 of the client device certificate 106 or 106B is not valid. For example, an authentication type identifier 168 is sent in plain text in the authentication message 421, the authentication type identifier 168 sent in plain text is valid if the authentication type identifier 168 matches a corresponding client device type identifier 156 comprised in the decrypted version 106B of the client device certificate 106.

For example, determining if a client device type identifier 156 of the client device certificate 106 is valid comprises determining if the client device type identifier 156 of the client device certificate 106 is comprised in a list of authorized client devices stored in the memory unit 6 and/or retrieved from remote data storage.

In one or more exemplary methods, verifying S6 the client device data 109 comprises verifying a digital signature 113A of the client device certificate 106, 106B, and verification fails if the digital signature is not verified. For example, the client device data 109 comprises a digital signature 113A included in or appended to the client device data 109 to protect integrity of the client device data 109. Verifying a digital signature 113A comprises e.g. computing a comparison result based on the digital signature 113A and a corresponding client device public key and comparing the comparison result to the received client device data 109. Verifying a digital signature 113A may comprise retrieving the corresponding client device public key from the memory unit 6 and/or from remote data storage. The digital signature 113A is verified as valid, or the verification is successful when the digital signature 113A raised to the power of the corresponding client device public key is identical to the received client device data 109.

In one or more exemplary methods, the client device certificate 106 comprises a signing device identifier 136A and/or a client device identifier 158, and verifying S6 the client device data 109 comprises determining if the signing device identifier 136A and/or the client device identifier 158 of the client device certificate 106 or 106B is valid and wherein verification fails if the client device identifier 158 and/or the signing device identifier 136A is not valid.

In one or more exemplary methods, the method 500 comprises receiving an additional authentication message 440 comprising client device data 110 and an authentication device identifier 169. The method may further comprise obtaining, from the memory unit 6, a common secret based on the authentication device identifier 169, generating an additional certificate key from the common secret, and verifying the client device data 110 based on the additional certificate key.

In one or more exemplary methods, the method 500 comprises generating an offline session key based on the common secret and the session identifier 180, and communicating with the client device 10 using the offline session key.

In one or more exemplary methods, the method 500, the authentication message 421 comprises an authentication token identifier, and the method 500 comprises storing the authentication token identifier in the memory unit 6 and linking the authentication token identifier with the common secret.

In one or more exemplary methods, the method 500 comprises receiving a further authentication message 450 comprising client device data 110, an authentication type identifier 168, an authentication key identifier 166 and/or an authentication session token identifier 167. The method 500 may comprise obtaining a common secret based on the authentication type identifier 168, generating a token key based on the common secret; and generating a session token identifier based on the token key and the session identifier. The method 500 may comprise verifying the authentication session token identifier 167 based on the session token identifier.

In one or more exemplary methods, the method 500 comprises generating a session key based on the session identifier 180 and the hearing device key, receiving and authenticating session data (e.g. hearing device data 430) based on the session key.

Exemplary hearing devices and methods are set out in the following items.

Item 1. A hearing device comprising
- a processing unit configured to compensate for hearing loss of a user of the hearing device;
- a memory unit; and
- an interface, wherein the processing unit is configured to:
- receive a connection request for a session via the interface;
- obtain a session identifier;
- transmit, via the interface, a connection response comprising a hearing device identifier and the session identifier;
- receive, via the interface, an authentication message comprising an authentication key identifier and client device data;
- select a hearing device key from a plurality of hearing device keys in the memory unit based on the authentication key identifier;
- verify the client device data based on the selected hearing device key; and
- terminate the session if the verification fails.

Item 2. Hearing device according to item 1, wherein the authentication message comprises an authentication type identifier, and wherein to select a hearing device key from a plurality of hearing device keys is based on the authentication type identifier.

Item 3. Hearing device according to any of items 1-2, wherein the client device data comprises an encrypted client device certificate; and wherein the processing unit is configured to generate a certificate key based on a common secret; and wherein to verify the client device data comprises to decrypt the encrypted client device certificate with the certificate key to obtain a decrypted version of the encrypted client device certificate.

Item 4. Hearing device according to item 3, wherein the common secret is based on the selected hearing device key and/or the session identifier.

Item 5. Hearing device according to any of items 3-4, wherein to verify the client device data comprises to determine if the authentication key identifier matches a client device key identifier of the client device certificate, and wherein verification fails if no match is determined.

Item 6. Hearing device according to any of items 3-5, wherein to verify the client device data comprises to determine if a client device type identifier of the client device certificate is valid and wherein verification fails if the client device type identifier of the client device certificate is not valid.

Item 7. Hearing device according to any of items 3-6, wherein to verify the client device data comprises to verify a digital signature of the client device certificate, and wherein verification fails if the digital signature is not verified.

Item 8. Hearing device according to any of items 3-7, wherein the client device certificate comprises a signing device identifier and/or a client device identifier, and wherein to verify the client device data comprises to determine if the signing device identifier and/or the client device identifier is valid and wherein verification fails if the client device identifier of the client device and/or the signing device identifier is not valid.

Item 9. Hearing device according to any of items 3-8, wherein the processing unit is configured to receive an additional authentication message comprising client device data and an authentication device identifier, wherein the processing unit is configured to
- obtain, from the memory unit, the common secret based on the authentication device identifier;
- generate an additional certificate key from the common secret; and
- verify the client device data based on the additional certificate key.

Item 10. Hearing device according to item 9, wherein the processing unit is configured to generate an offline session key based on the common secret and the session identifier, and wherein the processing unit is configured to communicate with the client device using the offline session key.

Item 11. Hearing device according to any of items 3-10, wherein the authentication message comprises an authentication token identifier, and wherein the processing unit is configured to store the authentication token identifier in the memory unit and to link the authentication token identifier with the common secret.

Item 12. Hearing device according to any of items 3-11, wherein the processing unit is configured to receive further authentication message comprising client device data, an authentication type identifier, an authentication key identifier and/or an authentication session token identifier, wherein the processing unit is configured to
- obtain a common secret based on the authentication type identifier;
- generate a token key based on the common secret;
- generate a session token identifier based on the token key and the session identifier; and
- verify the authentication session token identifier based on the session token identifier.

Item 13. Hearing device according to any of items 1-12, wherein the processing unit is configured to generate a session key based on the session identifier and the hearing device key, and wherein the processing unit is configured to receive and authenticate session data based on the session key.

Item 14. Method of operating a hearing device comprising a processing unit configured to compensate for hearing loss of a user of the hearing device; a memory unit; and an interface, the method comprising
- receiving a connection request for a session via the interface;
- obtaining a session identifier;
- transmitting, via the interface, a connection response comprising a hearing device identifier and the session identifier;
- receiving, via the interface, an authentication message comprising an authentication key identifier and client device data;
- selecting a hearing device key from a plurality of hearing device keys based on the authentication key identifier;
- verifying the client device data based on the selected hearing device key; and
- terminating the session if verification fails.

Item 15. Method according to item 14, wherein the authentication message comprises a authentication type identifier, and wherein selecting a hearing device key from a plurality of hearing device keys is based on the authentication type identifier.

Item 16. Method according to any of items 14-15, wherein the client device data comprises an encrypted client device certificate, and wherein the method comprises generating a certificate key based on the selected hearing device key and/or the session identifier; and wherein verifying the client device data comprises decrypting the encrypted client device certificate with the certificate key.

Item 17. Method according to any of items 14-16, wherein verifying the client device data comprises verifying a digital signature of the client device certificate, and wherein verification fails if the digital signature is not verified.

The use of the terms "first", "second", and the like does not imply any particular order, but they are included to identify individual elements. Moreover, the use of the terms first, second, etc. does not denote any order or importance, but rather the terms first, second, etc. are used to distinguish one element from another. Note that the words first and second are used here and elsewhere for labelling purposes only and are not intended to denote any specific spatial or temporal ordering. Furthermore, the labelling of a first element does not imply the presence of a second element.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES 1 system
2 hearing device
4 processing unit
5 microphone
6 memory unit
7 receiver
8 interface
10 client device
12 manufacturing device
14 fitting device
16 server device
21 communication link between client device and hearing device
22 communication link between server device and manufacturing device
23 communication link between hearing device and manufacturing device
24 communication link between server device and client device/fitting device
100 hearing device certificate
106 client device certificate
106A encrypted client device certificate
106B decrypted version of encrypted client device certificate
109 client device data
110 client device data in additional/further authentication message
112 hearing device identifier
113A digital signature of the client device certificate
113B digital signature of the hearing device certificate
114 first hearing device key identifier
115 first set of hearing device keys
115A first primary hearing device key
115B first secondary hearing device key
115C first tertiary hearing device key
115D first quaternary hearing device key
116 second hearing device key identifier
117 second set of hearing device keys
117A second primary hearing device key
117B second secondary hearing device key
117C second tertiary hearing device key
117D second quaternary hearing device key
130A certificate type identifier of the client device certificate
130B certificate type identifier of the hearing device certificate
132 version identifier
134 length identifier
136A signing device identifier of the client device certificate
136B signing device identifier of the hearing device certificate
138 hardware platform identifier
140 software platform identifier
142 certificate timestamp
144 client device type authorization identifier
146 token parameter
148A first hardware identifier of the client device certificate
148B first hardware identifier of the hearing device certificate
150 second hardware identifier of the client device certificate
156 client device type identifier
158 client device identifier
159 client device key identifier
160 Bluetooth address
166 authentication key identifier
167 authentication session token identifier
168 authentication type identifier
169 authentication device identifier
180 session identifier
400 signalling diagram
410/411 connection request
412 connection response
420/421 authentication message
422 authentication response
430 hearing device data
440 additional authentication message
450 further authentication message
500 exemplary methods

The invention claimed is:

1. A hearing device comprising:
a processing unit comprising at least some hardware, wherein the processing unit is configured to compensate for hearing loss of a user of the hearing device;
a memory unit; and
an interface;
wherein the processing unit is configured to:
receive a connection request via the interface;
transmit, via the interface, a connection response comprising a hearing device identifier and a session identifier;
receive, via the interface, an authentication message comprising an authentication key identifier and client device data, wherein the client device data comprises encrypted data;
obtain a hearing device key from the memory unit; and
verify the client device data;
wherein the processing unit is configured to obtain a key, the key being based on a secret or being the secret, and wherein the key is different from the hearing device key obtained from the memory of the hearing device and is different from the session identifier; and wherein the processing unit is configured to decrypt the encrypted data to obtain decrypted data based on the key.

2. The hearing device of claim 1, wherein the session identifier is for a session, and wherein the processing unit is configured to terminate the session if a verification of the client device data fails.

3. The hearing device according to claim 1, wherein the authentication message comprises an authentication type identifier, and wherein the processing unit is configured to obtain the hearing device key by selecting the hearing device key from a plurality of hearing device keys based on the authentication type identifier.

4. The hearing device according to claim 1, wherein the secret is based on the hearing device key and/or the session identifier.

5. The hearing device according to claim 1, wherein the processing unit is configured to verify the client device data by determining whether the authentication key identifier matches a client device key identifier.

6. The hearing device according to claim 1, wherein the processing unit is configured to verify the client device data by determining whether a client device type identifier is valid.

7. The hearing device according to claim 1, wherein the processing unit is configured to verify the client device data by verifying a digital signature.

8. The hearing device according to claim 1, wherein the processing unit is configured to generate a session key based on the session identifier and the hearing device key, and wherein the processing unit is configured to receive and authenticate session data based on the session key.

9. The hearing device according to claim 1, wherein the client device data comprises a digital signature.

10. The hearing device according to claim 1, wherein the client device data comprises a client device type identifier.

11. The hearing device according to claim 1, wherein the client device data comprises a client device identifier.

12. The hearing device according to claim 1, wherein the client device data comprises a client device key identifier.

13. The hearing device according to claim 1, wherein the client device data comprises a hardware identifier identifying a hardware.

14. The hearing device according to claim 1, wherein the client device data comprises a Bluetooth address.

15. The hearing device according to claim 1, wherein the client device data comprises a certificate type identifier for a client device certificate.

16. The hearing device of claim 1, wherein the encrypted data comprises an encrypted client device certificate.

17. The hearing device according to claim 16, wherein the client device certificate comprises a signing device identifier and/or a client device identifier, and wherein the processing unit is configured to verify the client device data by determining whether the signing device identifier and/or the client device identifier is valid.

18. A method of operating a hearing device comprising a processing unit configured to compensate for hearing loss of a user of the hearing device, a memory unit, and an interface, the method comprising:

receiving a connection request via the interface;

transmitting, via the interface, a connection response comprising a hearing device identifier and a session identifier;

receiving, via the interface, an authentication message comprising an authentication key identifier and client device data, wherein the client device data comprises encrypted data;

obtaining a hearing device key; and verifying the client device data;

wherein the method further comprises obtaining a key by the processing unit, the key being based on a secret or being the secret, and wherein the key is different from the hearing device key and is different from the session identifier; and wherein the method further comprises decrypting the encrypted data to obtain decrypted data based on the key.

19. The method according to claim 18, wherein the session identifier is for a session, and wherein the method further comprises terminating the session if a verification of the client device data fails.

20. The method according to claim 18, wherein the authentication message comprises an authentication type identifier, and wherein the hearing device key is obtained by selecting the hearing device key from a plurality of hearing device keys based on the authentication type identifier.

21. The method according to claim 18, further comprising generating a session key based on the session identifier and the hearing device key, and wherein the processing unit is configured to receive and authenticate session data based on the session key.

22. The method according to claim 18, wherein the client device data comprises a digital signature.

23. The method according to claim 18, wherein the client device data comprises a client device type identifier.

24. The method according to claim 18, wherein the client device data comprises a client device identifier.

25. The method according to claim 18, wherein the client device data comprises a client device key identifier.

26. The method according to claim 18, wherein the client device data comprises a hardware identifier identifying a hardware.

27. The method according to claim 18, wherein the client device data comprises a Bluetooth address.

28. The method according to claim 18, wherein the client device data comprises a certificate type identifier for a client device certificate.

* * * * *